(12) United States Patent
de Souza et al.

(10) Patent No.: US 10,833,356 B2
(45) Date of Patent: *Nov. 10, 2020

(54) KINETICALLY FAST CHARGING LITHIUM-ION BATTERY

(71) Applicant: International Business Machines Corporation, Armonk, NY (US)

(72) Inventors: Joel P. de Souza, Putnam Valley, NY (US); Devendra K. Sadana, Pleasantville, NY (US); John Collins, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/026,448

(22) Filed: Jul. 3, 2018

(65) Prior Publication Data
US 2020/0014058 A1    Jan. 9, 2020

(51) Int. Cl.
*H01M 10/0525* (2010.01)
*H01M 10/0562* (2010.01)
(Continued)

(52) U.S. Cl.
CPC ......... *H01M 10/0525* (2013.01); *B60L 53/11* (2019.02); *H01M 2/1626* (2013.01);
(Continued)

(58) Field of Classification Search
CPC ......... H01M 10/0525; H01M 10/0562; H01M 4/485; H01M 4/134; H01M 4/66; H01M 2/16
See application file for complete search history.

(56) References Cited

U.S. PATENT DOCUMENTS 8,426,052 B2    4/2013    Kozinsky et al.
8,597,831 B2    12/2013    Green et al.
(Continued)

FOREIGN PATENT DOCUMENTS

WO    2013142287 A1    9/2013
WO    2016163878 A1    10/2016

OTHER PUBLICATIONS

Office Action dated Feb. 5, 2020 received in U.S. Appl. No. 16/026,473.
(Continued)

*Primary Examiner* — Kenneth J Douyette
(74) *Attorney, Agent, or Firm* — Scully, Scott, Murphy & Presser, P.C.; L. Jeffrey Kelly, Esq.

(57) ABSTRACT

Rechargeable lithium-ion batteries that have a high-capacity and a fast charge rate are provided. The lithium-ion batteries contain an anode structure that is of unitary construction and includes a non-porous region and a porous region including a top porous layer (Porous Region 1) having a first thickness and a first porosity, and a bottom porous layer (Porous Region 2) located beneath the top porous layer and forming an interface with the non-porous region. At least an upper portion of the non-porous region and the entirety of the porous region are composed of silicon, and the bottom porous layer has a second thickness that is greater than the first thickness, and a second porosity that is greater than the first porosity.

22 Claims, 11 Drawing Sheets

(51) Int. Cl.
*H01M 4/485* (2010.01)
*H01M 4/134* (2010.01)
*H01M 4/66* (2006.01)
*H01M 2/16* (2006.01)
*B60L 53/10* (2019.01)
*H02J 7/00* (2006.01)
*H01M 4/02* (2006.01)

(52) U.S. Cl.
CPC ........... *H01M 4/134* (2013.01); *H01M 4/485* (2013.01); *H01M 4/661* (2013.01); *H01M 10/0562* (2013.01); *H02J 7/00* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 8,637,185 | B2 | 1/2014 | Berdichevsky et al. |
| 8,669,008 | B2 | 3/2014 | Cho et al. |
| 8,772,174 | B2 | 7/2014 | Green et al. |
| 8,945,774 | B2 | 2/2015 | Coowar et al. |
| 9,139,441 | B2 | 9/2015 | Anguchamy et al. |
| 9,142,833 | B2 | 9/2015 | Tolbert et al. |
| 9,263,771 | B2 | 2/2016 | Fukui et al. |
| 9,786,947 | B2 | 10/2017 | Yushin et al. |
| 9,871,248 | B2 | 1/2018 | Rayner et al. |
| 2004/0214085 | A1 | 10/2004 | Sheem et al. |
| 2005/0067294 | A1 | 3/2005 | Choe et al. |
| 2005/0074651 | A1* | 4/2005 | Kidai ............ H01M 8/1009 429/482 |
| 2009/0104528 | A1* | 4/2009 | Takahashi ............ H01M 4/13 429/223 |
| 2009/0186267 | A1 | 7/2009 | Tiegs |
| 2011/0104571 | A1* | 5/2011 | Zhamu ............ H01B 1/122 429/231.95 |
| 2012/0231321 | A1 | 9/2012 | Huang et al. |
| 2012/0244436 | A1 | 9/2012 | Kerlau |
| 2012/0244438 | A1 | 9/2012 | Kerlau |
| 2013/0078508 | A1 | 3/2013 | Tolbert et al. |
| 2013/0189602 | A1 | 7/2013 | Lahiri et al. |
| 2015/0214778 | A1 | 7/2015 | Martin |
| 2016/0204492 | A1 | 7/2016 | Jiang et al. |
| 2017/0125788 | A1 | 5/2017 | Ahn et al. |
| 2017/0179472 | A1 | 6/2017 | Allie et al. |
| 2017/0236654 | A1 | 8/2017 | Gardner et al. |

OTHER PUBLICATIONS

List of IBM Patents or Patent Applications Treated as Related dated Jul. 3, 2018, 2 pages.

Ge et al., "Porous doped silicon nanowires for lithium ion battery anode with long cycle life", Nano Letters, Published Apr. 9, 2012, pp. 2318-2323, vol. 12, No. 5.

Ulvestad, et al., "Porous Silicon as Anode Material for Li-ion Batteries: Structure and Performance", Masters Thesis, NTNU, Institutt for Materialteknologi, Jun. 2013, 140 pages, Trondheim, Norway.

Li et al., "Mesoporous silicon sponge as an anti-pulverization structure for high-performance lithium-ion battery anodes", Nature Communications, Published Jul. 8, 2014, 7 pages, vol. 5, 4105.

Limthongkul, et al., "Electrochemically-driven solid-state amorphization in lithium-silicon alloys and implications for lithium storage", Acta Materialia, accepted Oct. 11, 2002, pp. 1103-1113, 51.

Ding, et al, "Dendrite-Free Lithium Deposition via Self-Healing Electrostatic Shield Mechanism", J. Am. Chem. Soc. published Feb. 28, 2013, pp. 4450-4456, 135.

Raj, et al., "Current limit diagrams for dendrite formation in solid-state electrolytes for Li-ion batteries", Journal of Power Sources, Available online Jan. 17, 2017, pp. 119-126, 343.

Neudecker, et al., ""Lithium-Free" Thin-Film Battery with In Situ Plated Li Anode", Journal of the Electrochemical Society, revised manuscript received Sep. 17, 1999, pp. 517-523, 147, 2.

Wu, et al., "Designing nanostructured Si anodes for high energy lithium ion batteries", Nano Today, Available online Sep. 30, 2012, pp. 414-429, 7.

Saemann, et al., "Porous Silicon Thin Film Anodes for Lithium Ion Batteries", 2016, Unpublished. doi: 10.13140/rg.2.2.35267.60962.

Office Action dated Apr. 6, 2020 received in U.S. Appl. No. 16/026,461.

* cited by examiner

KINETICALLY FAST CHARGING LITHIUM-ION BATTERY

BACKGROUND

The present application relates to a rechargeable battery. More particularly, the present application relates to a fast charging high-capacity rechargeable lithium-ion battery including an anode structure composed of a substrate that includes a porous semiconductor region with two different porosities and a non-porous semiconductor region located beneath the porous semiconductor region.

In recent years, there has been an increased demand for electronic devices such as, for example, computers, mobile phones, tracking systems, scanners, medical devices, smart watches, power tools, remote systems and sensors, electric vehicles, internet of things (IOT) and fitness devices. One drawback with such electronic devices is the need to include a power supply within the device itself. Typically, a battery is used as the power supply of such electronic devices. Batteries must have sufficient capacity to power the electronic device for at least the length that the device is being used. Sufficient battery capacity can result in a power supply that is quite heavy and/or large compared to the rest of the electronic device. As such, smaller sized and lighter weight power supplies with sufficient energy storage are desired. Such power supplies can be implemented in smaller and lighter weight electronic devices in combination with lithium ion materials acting as the charge carrier; as lithium is the lightest and most electropositive charge carrier ion in the Periodic Table of Elements, lithium ion batteries and capacitors are considered the best fit for smaller, more energy dense energy storage devices.

Aside from the demand for lightweight energy storage devices that yield high energy density (high capacity), the need for faster charge rates (i.e., high speed charging kinetics) is also a current demand in the consumer market. For the next generation of batteries, it would be desirable if the battery was able to be fully charged in ten minutes or less in order to meet the needs of consumers in markets such as electric vehicles, portable telecommunications, IOT, and sensors. In the case of electric vehicles, if a consumer must wait longer than ten minutes to charge his/her vehicle, the battery powered electric vehicle may impose a limitation on the user's timeline and consequently, their travel range. Hence, fast charge rates of batteries used in the electric vehicles market would help create a viable electric vehicle market that would compete with and perhaps substitute for gas-powered automobiles.

Another drawback of conventional batteries is that some of the batteries contain potentially flammable and toxic materials that may leak causing safety hazards and expensive product recalls. As a result, these batteries may be subject to governmental regulations and cause damage to product reputation. The battery leakage risks can increase due to cracks forming within these batteries. These cracks are most likely caused by internal stress due to the battery charge/discharge cycles.

In addition and in the case for batteries including a solid-state electrolyte, there is evidence that battery lifetime performance is decreased due to dendrite formation within these batteries. Dendrite size increases over the lifetime of the battery and most likely relates to the number of charge/discharge cycles of the battery as well. As dendrites form within the battery and grow larger over time, the dendrites tend to electrically short the internal components of the battery, causing battery failure.

With the advent of lithium metal charge hosting electrodes, which provide stable, charge hosting of lithium metal and facilitate the reversible ionization mechanism of lithium ions into lithium metal, and vice versa, sustainable all-solid state or semi-solid state lithium ion batteries are attainable for mass production in consumer markets. Lithium metal maintains a theoretical energy capacity of 3850 mAh/g, whereas silicon-based lithium-hosting electrode materials maintain a theoretical capacity of 4200 mA/g. Both of these materials acting as an anode, for example, are greater than ten times the theoretical capacity of conventional graphitic anode materials (372 mAh/g). However, these batteries still have the risk of cracking, leakage, and internal dendrite failure.

Hence there is a need for an improved lithium-ion battery to provide an electrical power supply that has reduced charge times, has higher storage capacities, and is safe and rechargeable over many charge/discharge life cycles with reduced risk of cracking, leakage, and failure due to dendrite growth within the battery.

SUMMARY

Rechargeable lithium-ion batteries that maintain a high-capacity (i.e., a capacity of 100 mAh/g or greater) are provided. In some embodiments, the rechargeable lithium-ion batteries of the present application may also exhibit an increased lifetime, increased numbers of charge/discharge cycles, reduced charge time (i.e., a fast charge rate), a reduction of volume expansion and/or deformation during cycling, a reduction of dendrite and crack formation, and/or reduced battery leakage due to cracking.

The rechargeable lithium-ion battery of the present application includes an electrolyte region located between a lithium-containing cathode material layer and an anode structure. The anode structure is of unitary construction (i.e., a monolith structure) and includes a non-porous region and a porous region. The porous region comprises a top porous layer (Porous Region 1) having a first thickness and a first porosity, and a bottom porous layer (Porous Region 2) having a second porosity that is greater than the first porosity and a second thickness that is greater than the first thickness. The bottom porous layer (i.e., Porous Region 2) is located beneath the top porous layer (i.e., Porous Region 1) and forms an interface with the non-porous region. Also, at least an upper portion of the non-porous region and the entirety of the porous region are composed of silicon.

In another aspect of the present application, a method of making the aforementioned anode structure for a rechargeable lithium-ion battery is provided. The method includes anodic etching a substrate that includes at least an upper region composed of p-doped silicon. In one embodiment, the relative depth, pore structure and surface area of the anode structure including Porous Regions 1 and 2 is controlled through the applied conditions of the method of the present application.

Another aspect of the present application shows operational changes to the anode structure for a rechargeable battery during battery charge and discharge cycles. The anode structure and the battery structure of the present application charge in unique ways that exhibit reduced internal stresses and reduced dendrite growth over the battery lifetime. Without wishing to be bound by any theory, it is believed that the charging operation of the present application contributes to reduced levels of internal battery stress and reduced incidence of anode structure cracking.

In yet another aspect of the present application, cathode materials containing a specific grain size and density of grain boundaries or a columnar microstructure are used in combination with the present anode structure. The anode structure of the present application can sustainably plate lithium materials sourced from the respective cathode materials of various dimensions and mass. In particular, since the anode structure of the present application facilitates apparent lithium plating during charging, and lithium stripping during discharging, high capacity battery cells can be readily fabricated.

BRIEF DESCRIPTION OF SEVERAL VIEWS OF THE DRAWINGS

FIGS. 10A-10C are SEM images for an all solid-state lithium ion battery in accordance with the present application and containing a structure similar to that shown in FIG. 1 in which the electrolyte region is a solid-state material, wherein FIG. 10A is a SEM of the structure prior to galvanostatic-or-potentiostatic-induced charge or discharge, FIG. 10B is another SEM of the structure after 6 charge and discharge cycles, and FIG. 10C is yet another SEM image of the structure after 67 charge and discharge cycles.

DETAILED DESCRIPTION

Figure 1:
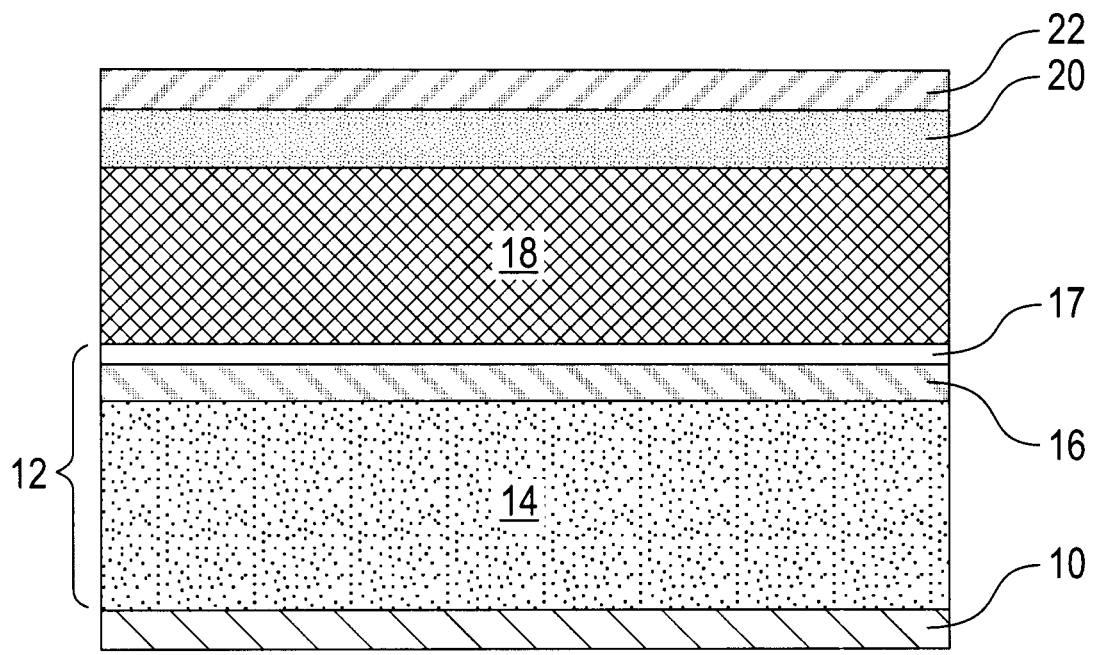
FIG. 1 is a cross sectional view of an exemplary rechargeable lithium-ion battery in accordance with a first embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that given this disclosure, there are various alternative embodiments of the present application that may be practiced without providing further specific details. In other instances, well-known structures or processing steps could be used in combination with and/or using the concepts of the present invention. These structures and steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

As stated above, rechargeable lithium-ion batteries that have a high-capacity (i.e., a capacity of 100 mAh/g or greater) are provided. In some embodiments, the rechargeable lithium-ion batteries of the present application may also exhibit an increased lifetime and/or faster charge rate and/or a reduction of volume expansion and/or deformation during charge/discharge cycling. The rechargeable lithium-ion batteries of the present application contain an anode structure that is engineered to increase the capacity, and in some instances, even the charge rate, of the battery (compared to conventional lithium-ion batteries that lack the anode structure of the present application).

In one aspect of the present application, a rechargeable lithium-ion battery is provided that includes an anode structure of unitary construction. Notably, the anode structure includes a non-porous region and a porous region comprising a top porous layer (Porous Region 1) having a first thickness and a first porosity, and a bottom porous layer (Porous Region 2) having a second thickness that is greater than the first thickness, and a second porosity that is greater than the first porosity. The bottom porous layer (Porous Region 2) is located beneath the top porous layer (Porous Region 1) and forms an interface with the non-porous region. In the anode structure of the present application, at least an upper portion of the non-porous region and the entirety of the porous region (including Porous Regions 1 and 2) are composed of silicon.

Methods of making the battery, methods of using the battery, structural features of the battery during use, and battery structures with cathodes enabling fast charging rates are also presented. The anode structure of the present application can be used as an element within various conventional 2-dimensional and 3-dimensional battery configurations.

It is believed that the anode structure of the present application is stronger than those in the prior art because Porous Region 1 contains smaller pore sizes on average compared with Porous Region 2. In some embodiments, the anode structure which includes a larger non-porous region together with Porous Region 1 and Porous Region 2 is mechanically, electrically, and chemically made of the same semiconductor material (i.e., the anode structure is of monolith construction). Thus, a mechanically stronger anode structure which is interconnected though out—at the atomic level, particularly for silicon substrates that are crystalline in composition—is provided.

It is also believed, that during the initial lithiation of the anode structure of the present application, an upper portion of Porous Region 2 becomes partially lithium containing, and the lower portion of Porous Region 2 is substantially devoid of lithium. During this process, a thin, seed layer begins to form, where the composition of the seed layer is composed of lithium rich material and silicon material and consequently forms a planar lithium metal-dense layer on top of Porous Region 1. This seed layer significantly reduces the migration of lithium ions deeper into Porous Region 2 of the anode structure (and at reduced lithium ion concentrations within Porous Region 2.). Hence, the formation of the thin seed layer on/in Porous Region 1 impedes further lithiation of Porous Region 2 and consequentially minimizes mechanical stress of the entire electrode due to suppression of further lithiation deeper into Porous Region 2 and the non-porous region.

As lithium migrates into the anode structure, the volume regions where the lithium combines with the silicon of the anode structure expand. This volume can expand up to 400 percent the original anode structure volume. Therefore, the anode structure of the present application enables a reduction of the volume expansion during the lifetime (entire charge/discharge cycles) of the rechargeable lithium-ion battery, resulting in reduced internal stress over the battery's entire use.

Since lithium combines with the silicon in the Porous Regions 1 and 2, the voids in these porous regions accommodate the increase of volume in these portions of the anode structure, further reducing the mechanical stresses of charge and discharge.

In addition, as the battery charges/discharges throughout the battery lifetime, the lithium maintains a seed layer of lithium in combination with silicon atoms present in the porous region of the anode structure; this seed layer may be referred to hereinafter as a lithium-containing seed layer. During seed layer formation, a small fraction of lithium (less than 10% of theoretical capacity) penetrates into and through Porous Region 1 and partially penetrates through Porous Region 2. This process is relatively slow if not electrochemically induced, and the process is faster if galvanostatically or potentiostatically induced. The lithium further forms a thin layer of metallic lithium on top of Porous Region 1 as the lithium accumulates on the previously deposited lithium-containing seed layer on/in Porous Region 1, expands the volume in the Porous Region 1 and minimizes lithium from further migrating deeper into the anode structure of the present application by physically closing of the pores in Porous Region 1 and by the lithium concentration in the seed layer and metallic layer providing an electrostatic barrier to further penetration of lithium into the anode structure of the present application.

The fully formed seed layer minimizes further lithium migration into the anode structure during subsequent charge/discharge cycles of the battery, thus reducing the cyclic mechanical stresses of volume expansion and contraction during the charge/discharge cycles over much of the battery's lifetime and commensurately reducing the stresses in the anode structure over the battery's life.

Since the fully formed seed layer inhibits the migration of lithium ions into the anode structure, the following is observed: (i) lithium ions moving toward the anode structure from the cathode and electrolyte regions of the battery during a charge cycle increase the thickness of the lithium metal layer above the seed layer; and (ii) lithium ions moving away from the anode structure from the cathode and electrolyte regions of the battery during a discharge cycle decrease the thickness of a lithium metal layer above the seed layer. However, lithium diffusion is minimized through the fully formed seed layer during the subsequent charge/discharge cycles of the battery, as opposed to that in the prior art. As a result of the anode structure of the present application, the lithium primarily deposits on the seed layer (for example, via ion-plating); at a much reduced amount, within Porous Region 2; but not in any significant amount in the non-porous region of the anode structure. As a result, a very large volume of the anode structure, i.e., the non-porous region of the anode structure, substantially does not absorb lithium during the charge/discharge cycles and therefore does not undergo significant volume expansion and contraction which cause cracking, and possible leakage, as observed in batteries not containing the anode structure of the present application.

It is speculated that the thin, seed layer once formed does not change much during the charge/discharge cycle of the battery. The porosity of Porous Region 1 is chosen such that the volume expansion in the top porous layer of the anode structure due to chemical bonding with lithium during the seed layer formation does not cause undue stress in Porous Region 1.

Applicant has experimental evidence showing that the seed layer forms a smooth, planar surface on which addition (and removal) of lithium ions during charge (discharge) cycles of operation cause a metallic lithium metal layer to grow (shrink) in thickness while maintaining a relatively smooth and planar surface over the life of the battery with higher probability of suppression of dendrite growth.

Referring now to FIG. 1, there is illustrated an exemplary rechargeable lithium-ion battery in accordance with a first embodiment of the present application. The exemplary rechargeable lithium-ion battery illustrated in FIG. 1 includes a battery material stack of an anode current collector 10, an anode structure 12, an electrolyte region 18, a lithium-containing cathode material layer 20, and a cathode current collector 22. Although the present application depicts the anode current collector 10 as the bottommost material layer of the lithium-ion battery, the present application also contemplates embodiments in which the cathode current collector 22 represents the bottommost material layer of the lithium-ion battery of the present application. Other orientations for the lithium-ion battery are also possible and are not excluded from the present application.

In some embodiments, the rechargeable lithium-ion battery of the present application may be formed upon a base substrate (not shown). If present, the base substrate may include any conventional material that is used as a substrate for a lithium-ion battery. In one embodiment, the base substrate may include a silicon-containing material and/or any other material having semiconductor properties. The term "silicon-containing material" is used throughout the present application to denote a material that includes silicon and has semiconducting properties. Examples of silicon-containing materials that may be employed as the base substrate for the rechargeable lithium ion battery include silicon (Si), a silicon germanium alloy (SiGe), or a carbon-doped silicon-based alloy. In one embodiment, the base substrate for the rechargeable lithium-ion battery is a bulk semiconductor substrate. By "bulk" it is meant that the base substrate is entirely composed of at least one semiconductor material. In one example, the base substrate may be entirely composed of silicon which may be single crystalline. In some embodiments, the bulk semiconductor substrate may include a multilayered semiconductor material stack including at least two different semiconductor materials. In one example, the multilayered semiconductor material stack may comprise, in any order, a stack of Si and a silicon germanium alloy. In another embodiment, the multilayered semiconductor material may comprise, in any order, a stack of Si and single or multiple silicon-based alloys, such as silicon-germanium or carbon-doped silicon-based alloys.

In other embodiments, the base substrate for the lithium-ion battery may be a current collector such as, for example, aluminum (Al), aluminum alloy, titanium (Ti), tantalum (Ta), tungsten (W), or molybdenum (Mo), copper (Cu), nickel (Ni), platinum (Pt) or any alloys of these materials.

In some embodiments, the base substrate may have a non-textured (flat or planar) surface. The term "non-textured surface" denotes a surface that is smooth and has a surface roughness on the order of less than 100 nm root mean square as measured by profilometry or Atomic Force Microscopy. In yet another embodiment, the base substrate may have a textured surface. In such an embodiment, the surface roughness of the textured substrate can be in a range from 100 nm root mean square to 100 µm root mean square as also measured by profilometry or Atomic Force Microscopy. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the base substrate is composed of a plurality of high surface area 3-dimensional features. In some embodiments, a plurality of metallic masks are used, which may be formed by depositing a layer of a metallic material and then performing an anneal. During the anneal, the layer of metallic material melts and balls-ups such that de-wetting of the surface of the base substrate occurs.

Referring back to FIG. 1, the anode current collector 10 that may be employed in the present application includes any metallic anode-side electrode material such as, for example, titanium (Ti), platinum (Pt), nickel (Ni), copper (Cu), aluminum (Al) or titanium nitride (TiN). The anode collector 10 may include layer of a metallic anode-side electrode material, or a material stack of at least two different metallic anode-side electrode materials. In one example, the anode current collector 10 includes a stack of, from bottom to top, nickel (Ni) and copper (Cu). The anode current collector 10 may have a thickness from 10 nm to 50 µm. Other thicknesses that are lesser than, or greater than, the aforementioned thickness values may also be used for the anode current collector 10. The anode current collector 10 can be formed utilizing a deposition process including, for example, chemical vapor deposition (CVD), plasma enhanced chemical vapor deposition (PECVD), evaporation, sputtering, plating, or mechanically attached metallic foil. For improved contact resistance, alloying of the metallic anode-side electrode material with a semiconductor material base would be preferred. Alloying may be achieved by performing a silicidation process as is known to those in the semiconductor industry.

Anode structure 12 is provided to a surface of the anode current collector 10. The anode structure 12 includes a non-porous region 14, and a porous region (16, 17) that has two layers having different porosities and thicknesses located on the non-porous region 14. The porous region of the anode structure includes a bottom porous layer 16 (i.e., Porous Region 2) and a top porous layer 17 (i.e., Porous Region 1). The non-porous region 14 and the porous region (16, 17) are of unitary construction. In one embodiment, the non-porous region 14 has a first surface that is in direct physical contact with a surface of Porous Region 2 (i.e., the bottom porous layer 16), and a second surface, opposite the first surface, that is in direct physical contact with the anode-current collector 10. The non-porous region 14 is the largest portion, by volume, of the anode structure 12. In some embodiments, the non-porous region 14 of the anode structure 12 may have a thickness from 5 µm to 700 µm.

Porous Region 1 (i.e., the top porous layer 17) has a first porosity and a first thickness, and Porous Region 2 (i.e., the bottom porous layer 16) has a second porosity and a second thickness. In order to accommodate volume changes during charging and discharging, the porous region (16, 17) is engineered such that the second porosity and second thickness are greater than the first porosity and first thickness, respectively. In one embodiment, the second porosity has an average pore opening of greater than 3 nm, and the second thickness is between 0.1 µm to 20 µm, while the first porosity has an average pore opening of less than 3 nm, and the first thickness is 50 nm or less. Without wishing to be bound by any theory, it is believed that the relatively small diameter of pores contained in Porous Region 1 facilitates the formation of a planarized lithium-containing seed layer (to be described in greater detail herein below).

In the present application, the porosity can be a measure of the volume percentage of the pores (void region in the silicon) divided by the total volume of the porous region (16, 17). The porosity may be measured using techniques well known to those skilled in the art including, for example, SEM, RBS, X-ray Diffraction (XRD), Nuclear Magnetic Resonance (NMR), Raman Spectroscopy, gas-on-solid adsorption (porosimetry), mercury space filling porosimetry, density functional theory (DFT), or Brunauer-Emmett-Teller (BET).

It is noted that the present application avoids a porous region (16, 17) that has a porosity that is 30% or greater, which as in the prior art, has a tendency to be brittle and may crack during use such that battery failure may occur.

Without wishing to be bound by any theory, it is speculated that the porous region (16, 17) has a porosity such that a sufficient open space within the porous region (16, 17) exists to accommodate volume expansion (i.e., swelling) and/or deformation of both Porous Region 1 (i.e., the top porous layer 17) and to a lesser extent Porous Region 2 (i.e., the bottom porous layer 16). This is particularly true in the formation of a lithium-containing seed layer, described in greater detail herein below, in Porous Region 1 (i.e., the top porous layer 17) in the initial operation of a rechargeable lithium-ion battery.

Porous Region 2 (i.e., the bottom porous layer 16) of the anode structure 12 of the present application has a compressive stress from 0.02 percent to 0.035 percent. Compressive stress can be determined by X-ray Diffraction or other optical or spectroscopic techniques.

As mentioned above, Porous Region 1 (i.e., the top porous layer 17), Porous Region 2 (i.e., the bottom porous layer 16) and the non-porous region 14 of the anode structure 12 are of unitary construction. Thus, non-porous region 14 and porous region (16, 17) are electrically, chemically and mechanically part of a same anode structure. In some embodiments, the Porous Region 1 (i.e., the top porous layer 17), Porous Region 2 (bottom porous layer 16) and the non-porous region 14 are entirely composed of silicon. In this embodiment, the anode structure 12 is created by efficient method steps. In addition, and in embodiments in which the entire anode structure 12 is made of the same semiconductor material (i.e., Si) there are no mechanical stresses or additional electrical resistances within the anode structure 12 that might be caused by interfaces between dissimilar materials. In one example, the anode structure 12 including the non-porous region 14 and porous region (16, 17) has a three-dimensional (3D) lattice framework composed of a p-type crystalline silicon material. The term "p-type" refers to the addition of impurities to an intrinsic silicon material that creates deficiencies of valence electrons. In a silicon-containing silicon material, examples of p-type dopants, i.e., impurities, include, but are not limited to, boron, aluminum, gallium and indium.

In some embodiments, at least an upper portion of the non-porous region 14 of anode structure 12 that forms an interface with Porous Region 2 (i.e., the bottom porous layer 16) as well as the entire porous region (16, 17) are composed of a same material such as, for example, p-type doped silicon material, while a lower portion of the non-porous region 14 may be composed of a different semiconductor material than the upper portion of the non-porous region 14 of anode structure 12 that forms an interface with Porous Region 2 (i.e., the bottom porous layer 16) as well as the entire porous region (16, 17). For example, the lower portion of the non-porous region 14 that is present beneath the porous region (16, 17) may include doped silicon having a different dopant concentration than the original p-type doped silicon used to provide the anode structure 12, or a silicon germanium alloy containing less than 10 atomic percent germanium.

In some embodiments and due to the simplicity and manufacturability of single crystalline material, the silicon material that provides at least an upper portion of the non-porous region 14 of anode structure 12 that forms an interface with Porous Region 2 (i.e., the bottom porous layer 16) as well as the entire porous region (16, 17) is single crystalline. In some embodiments, the cost of the process can be reduced and controlled by using lower grade silicon and by adjusting the silicon thickness and simplified crystal growth techniques (as is the case observed in the solar industry).

The anode structure 12 of the present application can be formed utilizing an anodic etching process as defined in greater detail herein below (see, for example, FIG. 11).

The electrolyte that can be present in the electrolyte region 18 may include any conventional electrolyte that can be used in a rechargeable lithium-ion battery. The electrolyte may be a liquid electrolyte, a solid-state electrolyte, a gel type electrolyte, a polymer electrolyte, a semi-solid electrolyte, an electrolyte which originally is a liquid, but then is subjected to conditions which transforms its phase into a solid or semi-solid, or any combination thereof such as, for example, a combination of a liquid electrolyte and a solid state electrolyte. In some embodiments, the electrolyte region 18 is composed entirely of a solid-state electrolyte. In other embodiments, the electrolyte region 18 may include a solid-state electrolyte and a liquid electrolyte. The electrolyte is between Porous Region 1 (i.e., the top porous layer 17) and the lithium-containing cathode material layer 20.

In some embodiments, the electrolyte region 18 is a solid-state electrolyte that is composed of a polymer based material or an inorganic material. In other embodiments, the electrolyte region 18 is a solid-state electrolyte that includes a material that enables the conduction of lithium-ions. Such materials may be electrically insulating and ionically conducting. Examples of materials that can be employed as the solid-state electrolyte include, but are not limited to, lithium phosphorus oxynitride (LiPON) or lithium phosphosilicate oxynitride (LiSiPON), thio-LiSiCoN electrolytes (e.g., $Li_2S$-$P_2S_5$ in any ratio), $Li_{10}SnP_2S_{12}$, LiSiCoN-like electrolytes (e.g., $Li_{10}GeP_2S_{12}$), Argyrodite electrolytes (e.g., $Li_6PS_5Br$), Garnet Electrolytes (e.g., $Li_{6.55}La_3Zr_2Ga_{0.15}O_{12}$), NaSiCoN-like electrolytes (e.g., $Li_{1.3}Al_{0.3}Ti_{1.7}(PO_4)_3$), Li-Nitride electrolytes (e.g., $Li_3N$), Li-Hydride Electrolytes (e.g., $Li_2NH$), or Pervoskite Electrolytes (e.g., $Li_{0.34}La_{0.51}TiO_{2.94}$).

In embodiments in which a liquid electrolyte is employed in the electrolyte region 18, a separator, not shown, may be used. A separator may also be used in embodiments in which two dissimilar electrolytes are present in the electrolyte region 18. When a separator is employed, the separator may include one or more of a flexible porous material, a gel, or a sheet that is composed of cellulose, cellophane, polyvinyl acetate (PVA), PVA/cellulous blends, polyethylene (PE), polypropylene (PP) or a mixture of PE and PP. The separator may also be composed of inorganic insulating nano/microparticles.

In embodiments in which a solid-state electrolyte layer is employed as the electrolyte region 18, the solid-state electrolyte may be formed utilizing a deposition process such as, sputtering, solution deposition, hot pressing, cold pressing, slurry casting followed by controlled temperature and pressure conditions or plating. In one embodiment, the solid-state electrolyte is formed by sputtering utilizing any conventional target source material in conjunction with reactive or inert gasses. For examples, sputtering may be performed in the presence of at least a nitrogen-containing ambient, in forming the LiPON electrolyte. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

The lithium-containing cathode material layer 20 may include a lithium-containing material such as, for example, a lithium-based mixed oxide. Examples of lithium-based mixed oxides that may be employed as the lithium-containing cathode material layer 20 include, but are not limited to, lithium cobalt oxide ($LiCoO_2$), lithium nickel oxide ($LiNiO_2$), lithium manganese oxide ($LiMn_2O_4$), lithium vanadium pentoxide ($LiV_2O_5$), lithium nickel manganese cobalt (NMC), nickel cobalt aluminum oxide (NCA), any combination of sulfur-based materials with lithium and other structure supporting elements such as iron, or lithium iron phosphate ($LiFePO_4$). The lithium-containing cathode material layer 20 may have a thickness from 10 nm to 50 μm. Other thicknesses that are lesser than, or greater than, the aforementioned thickness values may also be used for lithium-containing cathode material layer 20.

In some embodiments, the lithium-containing cathode material layer 20 may be formed utilizing a deposition process such as, sputtering, slurry casting or plating. In one embodiment, the lithium-containing cathode material layer 20 is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof in conjunction with oxygen.

In some embodiments, the lithium-containing cathode material layer 20, may be formed by slurry casting, which may contain a mixture of electrochemically active [cathode materials, electron-conducting materials (e.g., carbon-based materials)] and inactive (binder materials) components. The thickness of such layers could range from 5 μm to 500 μm. These slurries may also have an electrolyte component in the mixture, along with a lithium based salt(s).

The cathode current collector (i.e., cathode-side electrode) 22 may include any metallic cathode-side electrode material such as, for example, titanium (Ti), platinum (Pt), nickel (Ni), aluminum (Al) or titanium nitride (TiN). The cathode current collector 22 may include a single layer of a metallic cathode-side electrode material, or a material stack including at least two different metallic cathode-side electrode materials. In one example, the cathode current collector 22 includes a stack of, from bottom to top, titanium (Ti), platinum (Pt) and titanium (Ti). In one embodiment, the metallic electrode material that provides the cathode current collector 22 may be the same as the metallic electrode material that provides the anode current collector 10. In another embodiment, the metallic electrode material that provides the cathode current collector 22 may be different from the metallic electrode material that provides the anode current collector 10. The cathode current collector 22 may have a thickness within the range mentioned above for the anode current collector 10. The cathode current collector 22 may be formed utilizing one of the deposition processes mentioned above for forming the anode current collector 10. For slurry-based cathode materials, metal foils may be employed during the casting process.

Figure 2:
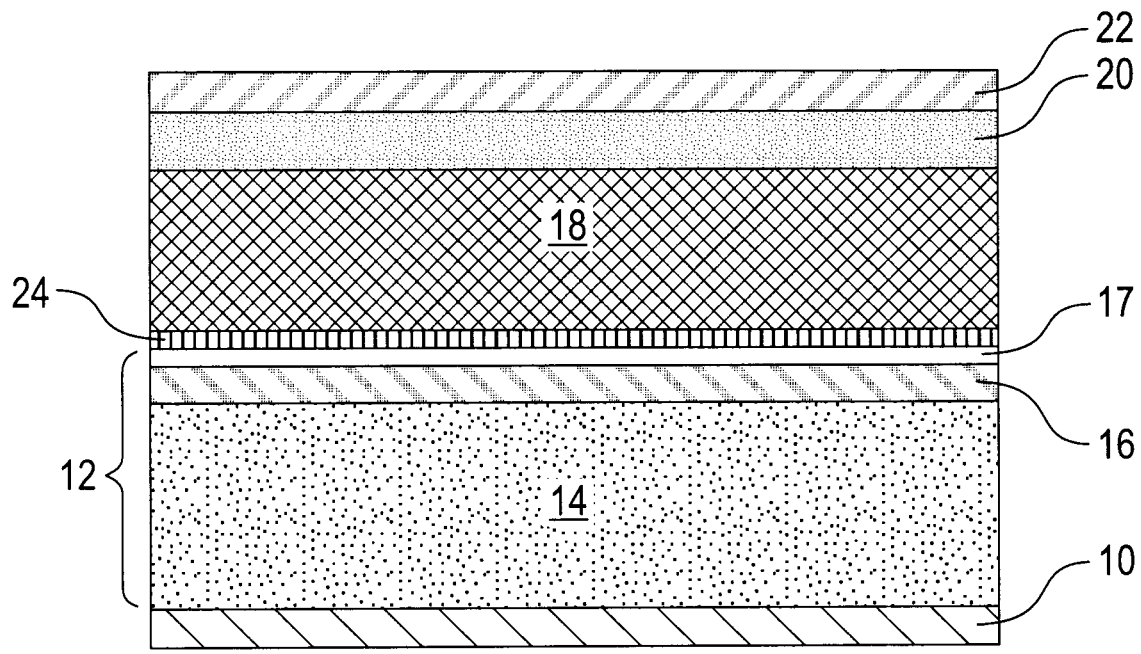
FIG. 2 is a cross sectional view of another exemplary rechargeable lithium-ion battery in accordance with a second embodiment of the present application.

Referring now to FIG. 2, there is illustrated another exemplary rechargeable lithium-ion battery in accordance with a second embodiment of the present application. The exemplary lithium-ion battery illustrated in FIG. 2 is similar to the rechargeable lithium-ion battery stack shown in FIG. 1 except that an interfacial additive material layer 24 is positioned between the Porous Region 1 (i.e., the top porous layer 17) of the anode structure 12 and the electrolyte region 18. Specifically, the exemplary rechargeable lithium-ion battery illustrated in FIG. 2 includes a battery material stack of an anode current collector 10, as defined above, an anode structure 12, as defined above, an interfacial additive material layer 24 to be defined in greater detail herein below, an electrolyte region 18, as defined above, a lithium-containing cathode material layer 20, as defined above, and a cathode current collector 22, as defined above. The battery material stack shown in FIG. 2 may have other orientations besides that shown in FIG. 2. For example, it may be flipped 180°.

An interfacial additive (such as a dielectric material) layer 24 is present on the exposed surface of Porous region 1 (i.e., the top porous layer 17) of the anode structure 12; layer 24 may be a single layered structure or a multilayered structure. The interfacial additive material layer 24 may include any interfacial additive material layer such as, for example, a carbon based material, or gold or a dielectric material oxide such as, for example, aluminum oxide. The interfacial additive material may be a mixture with any combination of electrically insulating as well as Li-ion ionic-conducting components, such as but not limited to $LiNbO_3$, $LiZrO_2$, $Li_4SiO_4$, or $Li_3PO_4$. The interfacial additive material layer 24 may have a thickness from 1 nm to 50 nm. The interfacial additive material layer 24 may be formed utilizing a deposition process including, for example, chemical vapor deposition, plasma enhanced chemical vapor deposition, or atomic layer deposition. The interfacial additive material layer 24 can enable a high magnitude of chemical and physical interconnectivity between electrolyte and electrode layers under repeated electrochemical conditioning. The interfacial additive material layer 24 can maintain structural rigidity for interfacial overlap, which enables high ionic conductivity and reduces the internal resistance of the cell. In addition, the interfacial additive material layer 24 can provide electrical insulation at the interfaces of concern, preventing the leaking or shorting of the cell through spatial control of electrically conductive components within the battery. The interfacial additive material layer 24, as described above, could be continuous or patterned.

Figure 3:
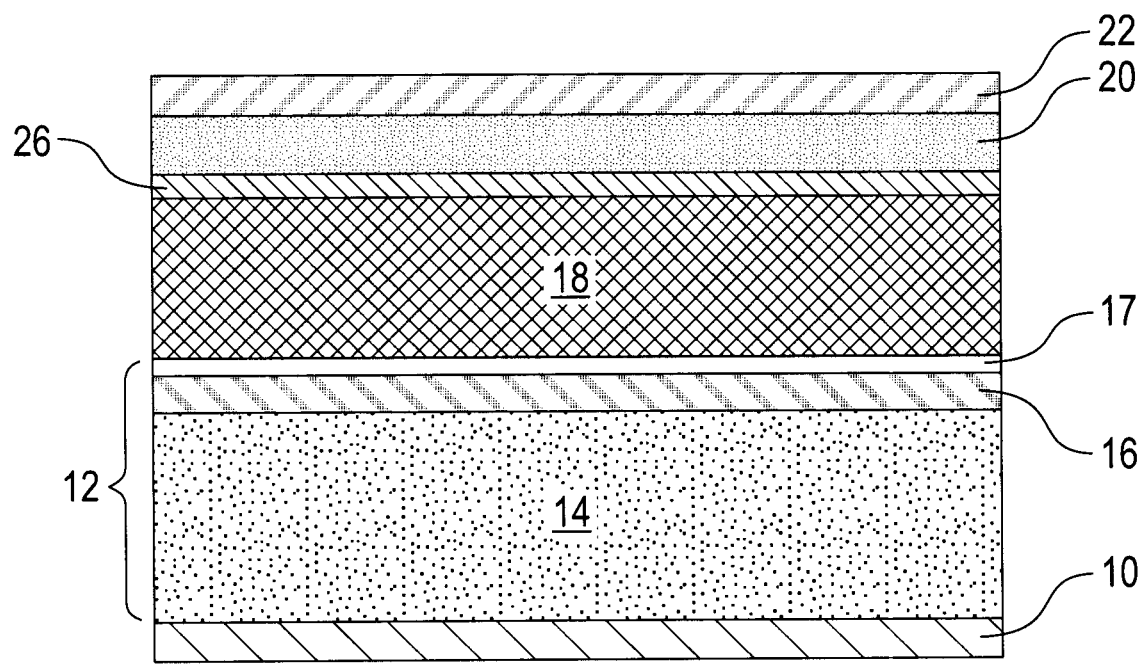
FIG. 3 is a cross sectional view of an exemplary rechargeable lithium-ion battery in accordance with a third embodiment of the present application.

Referring now to FIG. 3, there is illustrated another exemplary rechargeable lithium-ion battery in accordance with a third embodiment of the present application. The exemplary rechargeable lithium-ion battery illustrated in FIG. 3 is similar to the rechargeable lithium-ion battery stack shown in FIG. 1 except that an interfacial additive material layer 26 is positioned between the electrolyte region 18 and the lithium-containing cathode material layer 20. Specifically, the exemplary rechargeable lithium-ion battery illustrated in FIG. 3 includes a battery material stack of an anode current collector 10, as defined above, an anode structure 12, as defined above, an electrolyte region 18, as defined above, an interfacial additive material layer 26 to be defined in greater detail herein below, a lithium-containing cathode material layer 20, as defined above, and a cathode current collector 22, as defined above. The battery material stack shown in FIG. 3 may have other orientations besides that shown in FIG. 3. For example, it may be flipped 180°.

The interfacial additive material layer 26 may include any of the interfacial additive materials mentioned above for interfacial additive material layer 24. The interfacial additive material layer 26 may have a thickness from 1 nm to 20 nm to minimize the increase of cell internal resistance. The interfacial additive material layer 26 may be formed utilizing a deposition process including, for example, chemical vapor deposition, plasma enhanced chemical vapor deposition, or atomic layer deposition. The interfacial additive material layer 26 can maintain structural rigidity for interfacial overlap, which enables high ionic conductivity and reduces the internal resistance of the cell. In addition, the interfacial additive material layer 26 can provide electrical insulation at the interfaces of concern, preventing the leaking or shorting of the cell through spatial control of electrically conductive components within the battery.

Figure 4:
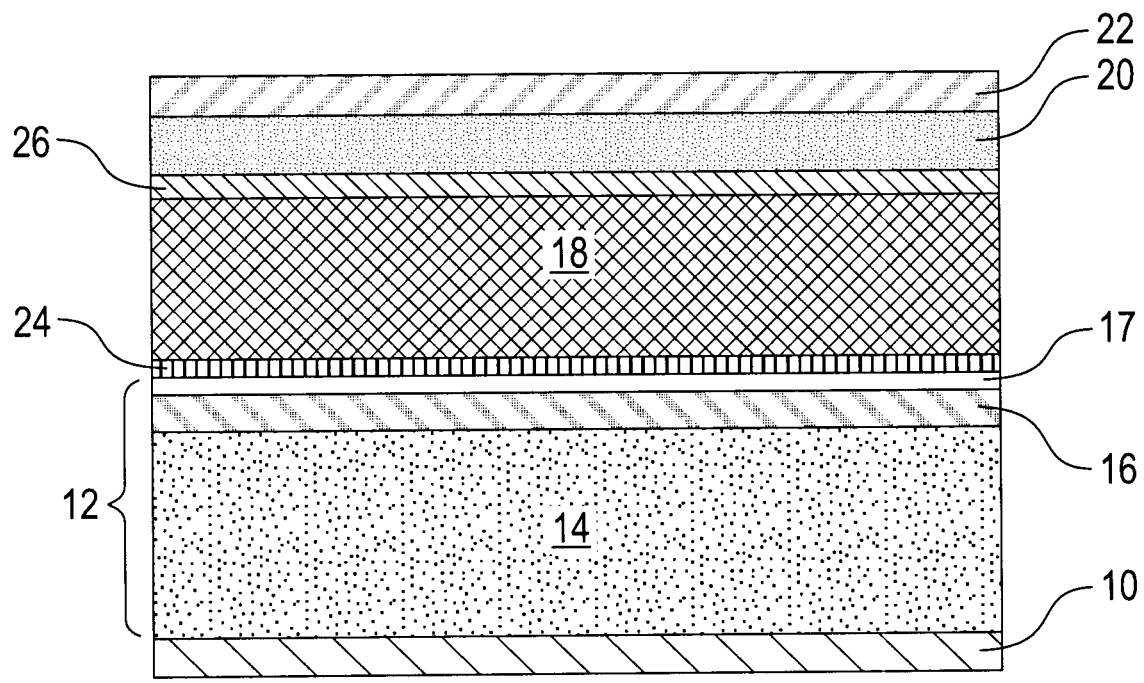
FIG. 4 is a cross sectional view of an exemplary rechargeable lithium-ion battery in accordance with a fourth embodiment of the present application.

Referring now to FIG. 4, there is illustrated an exemplary rechargeable lithium-ion battery in accordance with a fourth embodiment of the present application. The exemplary rechargeable lithium-ion battery illustrated in FIG. 4 is similar to the rechargeable lithium-ion battery stack shown in FIG. 1 except that an interfacial additive material layer 24 is positioned between Porous Region 1 (i.e., the top porous layer 17) of the anode structure 12 and the electrolyte region 18, and another interfacial additive material layer 26 is positioned between the electrolyte region 18 and the lithium-containing cathode material layer 20, and another dielectric material layer 26. Specifically, the exemplary rechargeable lithium-ion battery illustrated in FIG. 4 includes a battery material stack of an anode current collector 10, as defined above, an anode structure 12, as defined above, an interfacial dielectric material layer 24, as defined above, an electrolyte region 18, as defined above, an interfacial dielectric material layer 26, as defined above, a lithium-containing cathode material layer 20, as defined above, and a cathode current collector 22, as defined above. The battery material stack shown in FIG. 4 may have other orientations besides that shown in FIG. 4. For example, it may be flipped 180°.

Figure 5:
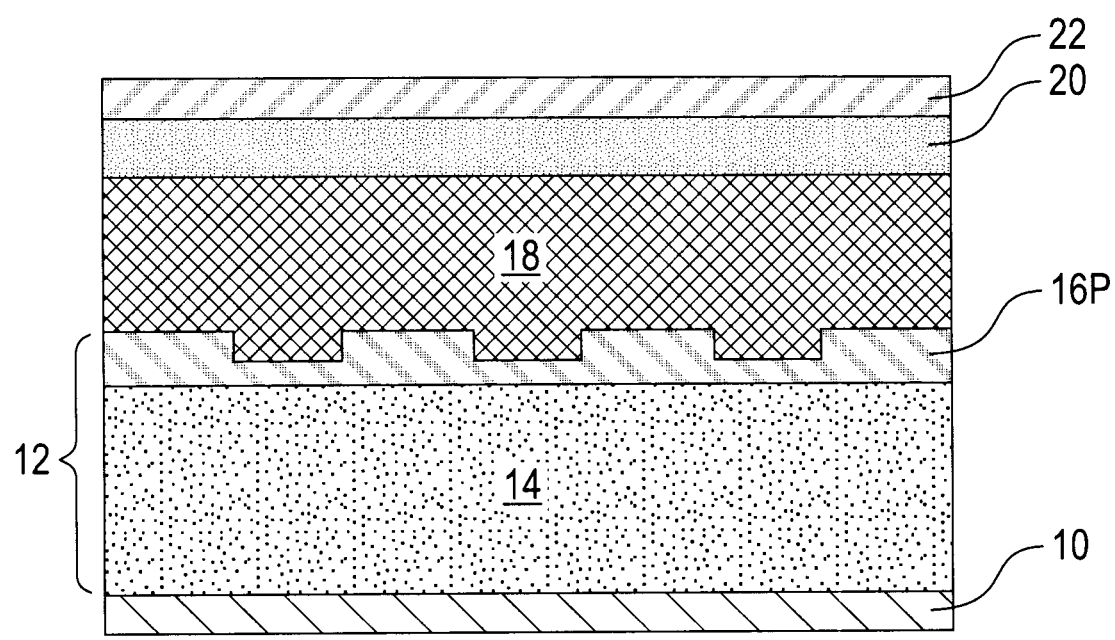
FIG. 5 is a cross sectional view of an exemplary rechargeable lithium-ion battery in accordance with a fifth embodiment of the present application.

Referring now to FIG. 5, there is illustrated an exemplary rechargeable lithium-ion battery in accordance with a fifth embodiment of the present application. The exemplary rechargeable lithium-ion battery illustrated in FIG. 5 is similar to the rechargeable lithium-ion battery stack shown in FIG. 1 except that the porous region (including Porous Region 1) and Porous Region 2)) of the anode structure 12 are patterned. The patterned porous region, including both Porous Regions 1 and 2 (not shown individually), is designated as element 16P in FIG. 5 of the present application. Specifically, the exemplary lithium-ion battery illustrated in FIG. 5 includes a battery material stack of an anode current collector 10, as defined above, an anode structure 12, as defined above, and having a patterned porous region 16P (including Porous Regions 1 and 2), an electrolyte region 18, as defined above, a lithium-containing cathode material layer 20, as defined above, and a cathode current collector 22, as defined above. The battery material stack shown in FIG. 5 may have other orientations besides that shown in FIG. 5. For example, it may be flipped 180°.

An interfacial additive material layer 24 may be formed between the patterned porous region 16P and the electrolyte region 18 and/or interfacial additive material layer 26 may be formed between the electrolyte region 18 and the lithium-containing cathode material layer 20. The patterning of the porous region (including Porous Regions 1 and 2) may be performed utilizing conventional patterning techniques including, for example, lithography and etching, possibly in conjunction with mechanical grinding/polishing, and doping. In some embodiments, patterning of the porous region (16, 17) may be performed by simple selective doping in silicon, for example, by ion implantation, epi, or thermal doping. Patterned porous region 16P (which collectively includes Porous Regions 1 and 2) may provide a means to further increase the capacity as well as the kinetic (power) capabilities of the anode structure 12 of the present application. Patterned porous region 16P (which collectively includes Porous Regions 1 and 2) may also provide a faster charge rate.

Figure 6A:
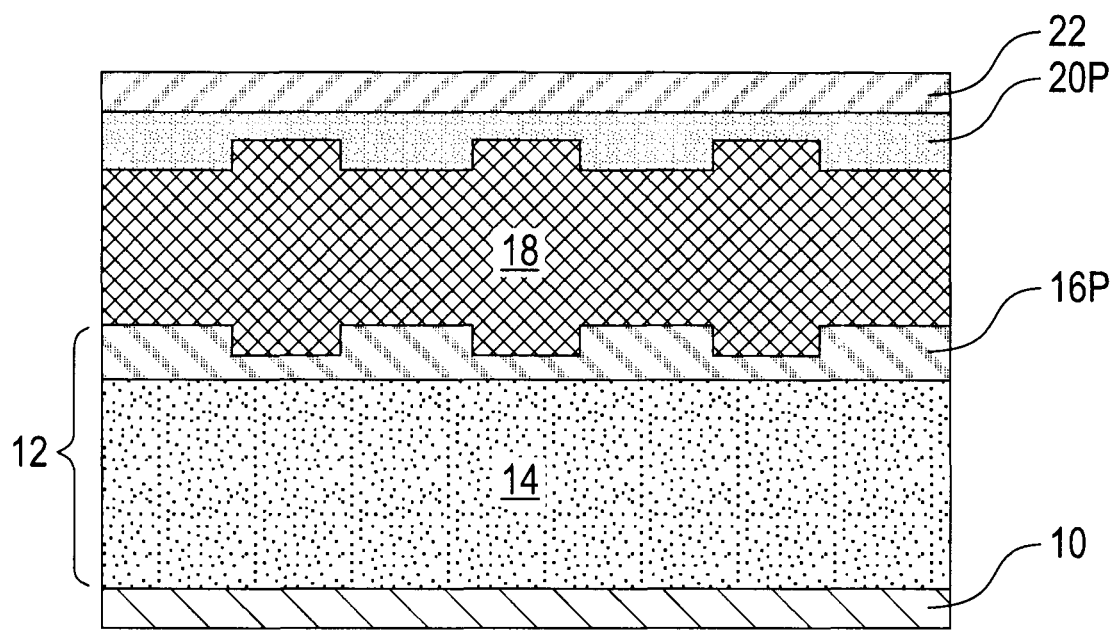
FIGS. 6A-6B are cross sectional views of exemplary rechargeable lithium-ion batteries in accordance with a sixth embodiment of the present application.
Figure 6B:
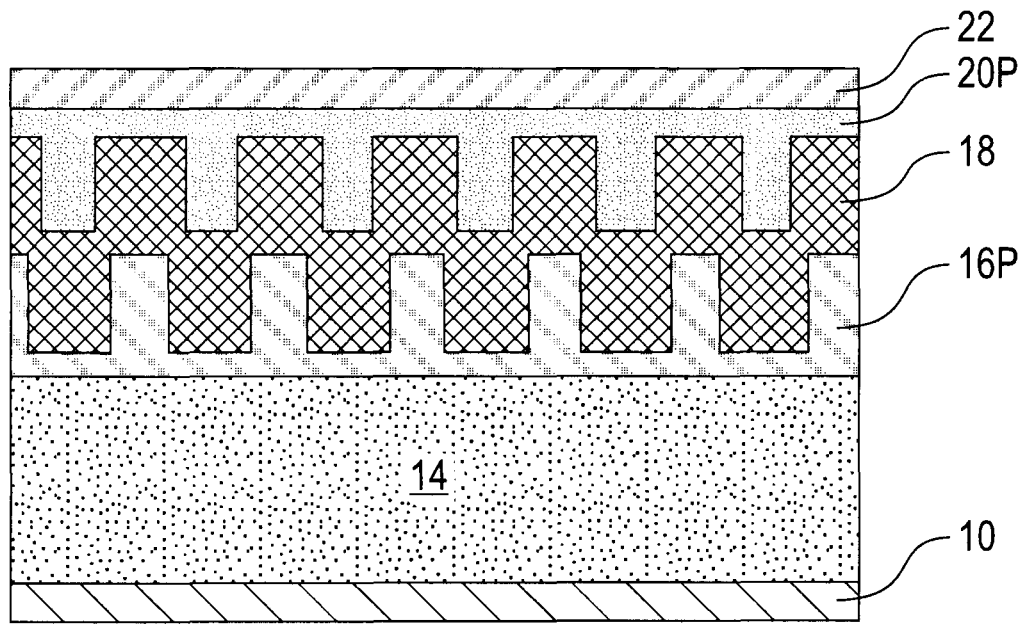

Referring now to FIGS. 6A-6B, there are illustrated exemplary rechargeable lithium-ion batteries in accordance with a sixth embodiment of the present application. The exemplary rechargeable lithium-ion batteries illustrated in FIGS. 6A and 6B are similar to the lithium-ion battery stack shown in FIG. 1 except that the porous region (including Porous Region 1 and Porous Region 2) of the anode structure 12 are patterned and the lithium-containing cathode material layer 20 is also patterned. The patterned porous region (including Porous Regions 1 and 2) is designated as element 16P in FIGS. 6A-6B of the present application, and the patterned lithium-containing cathode material layer is designated as element 20P is FIGS. 6A-6B of the present application. Specifically, the exemplary lithium-ion batteries illustrated in FIGS. 6A-6B include a battery material stack of an anode current collector 10, as defined above, an anode structure 12, as defined above and having a patterned porous region 6P (including Porous Regions 1 and 2), an electrolyte region 18, as defined above, a patterned lithium-containing cathode material layer 20P, as defined above, and a cathode current collector 22, as defined above. The battery material stacks shown in FIGS. 6A-6B may have other orientations besides that shown in FIGS. 6A-6B. For example, they may be flipped 180°.

In one embodiment, as shown in FIG. 6A, the patterned battery material stack components 16P and 20P oppose one another, e.g., the higher regions (lower regions) of each component face one another in the same lateral position of the battery, in a non-complimentary manner. Alternatively, the patterned battery material stack components 16P and 20P may be complimentary, in shape—fitting together like lock and key, as shown in FIG. 6B. In this embodiment, the proximity of patterned electrodes with respect to one another, in addition to electrolyte thickness (electrolyte fills all space between battery components 16P and 20P) can be controlled by aligning the opposing electrodes at specific proximity with regard to one another. An interfacial additive material layer 24 may be formed between the patterned region 16P (which collectively includes Porous Regions 1 and 2) and the electrolyte region 18 and/or interfacial additive material layer 26 may be formed between the electrolyte region 18 and the patterned lithium-containing cathode material layer 20P.

The patterning of the lithium-containing cathode material layer 20P may be performed utilizing conventional patterning techniques including, for example, lithography and etching, or by utilizing a lift-off process. The patterned lithium-containing cathode material layer 20P may be complementary or non-complementary with respect to the patterned porous region 16P. The patterned lithium-containing cathode material layer 20P may provide a further increase the capacity as well as the kinetic charge/discharge capabilities of the lithium-ion battery of the present application. Collectively, the patterned the porous region 16P (which collectively includes Porous Regions 1 and 2) and the patterned lithium-containing cathode material layer 20P may provide maximized battery capacity and, possible increase the charge rate of the battery—as pattern dimensions, along with final fixed proximity of spatial volume between the patterned porous region 16P (which collectively includes Porous Regions 1 and 2) and the patterned lithium-containing cathode material layer 20P may impact and determine the thickness, density and other physical properties of the electrolyte region 18—thereby directly affecting ion-electron-mobility properties throughout the battery stack.

Figure 7A:
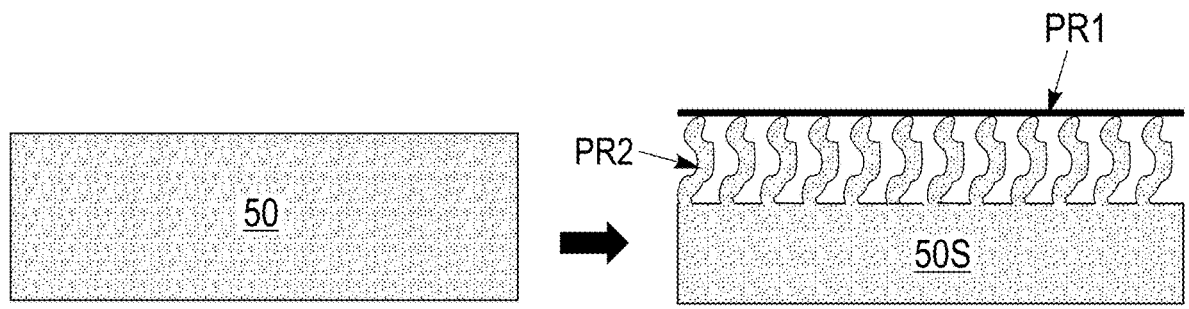
FIG. 7A is a schematic illustration of a method of forming the anode structure of the present application starting from a p-type crystalline silicon substrate prior to anodization, and the anode structure after anodization.

Referring now to FIG. 7A, there is illustrated a schematic which illustrates the overall process of utilizing a crystalline p-type silicon material 50 for the anodic etching method described herein. Notably, the process begins by providing a crystalline p-type silicon material 50, and then performing anodic etching which provides an anode structure that includes Porous Region 1 (PR1) (i.e., the top porous layer 17) and Porous Region 2 (PR2) (i.e., the bottom porous layer 16) along with a non-etched portion of the original crystalline p-type silicon substrate residing below the two porous regions. The non-etched portion of the original substrate defines the non-porous region 14 of the silicon substrate. In this drawing, the non-porous region 14 is also designated as element 50S; it is noted that non-porous 50S has the same characteristics as non-porous region 14 mentioned above.

Figure 7B:
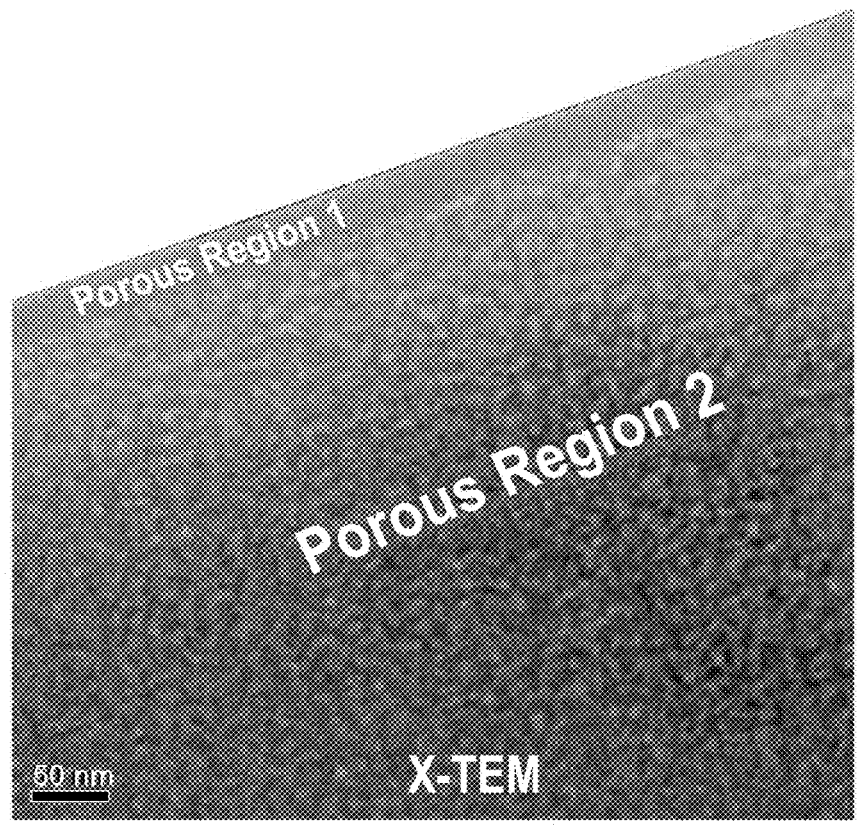
FIG. 7B is a cross sectional transmission electron micrograph (TEM) of a porous silicon anode structure displaying two distinct porous regions upon anodization.

FIG. 7B is a transmission electron micrograph (TEM) (though a cross-sectional view) of an experimentally fabricated porous silicon substrate, such as the one illustrated in FIG. 7A. This TEM micrograph clearly illustrates the two porous regions, PR1 (i.e., the top porous layer 17), and PR2 (i.e., bottom porous layer 16), illustrated in FIG. 7A with the Porous Region 1 having a thickness on the order of about 30 nm, and Porous Region 2 being far thicker than Porous Region 1.

Figures 8A, 8B:
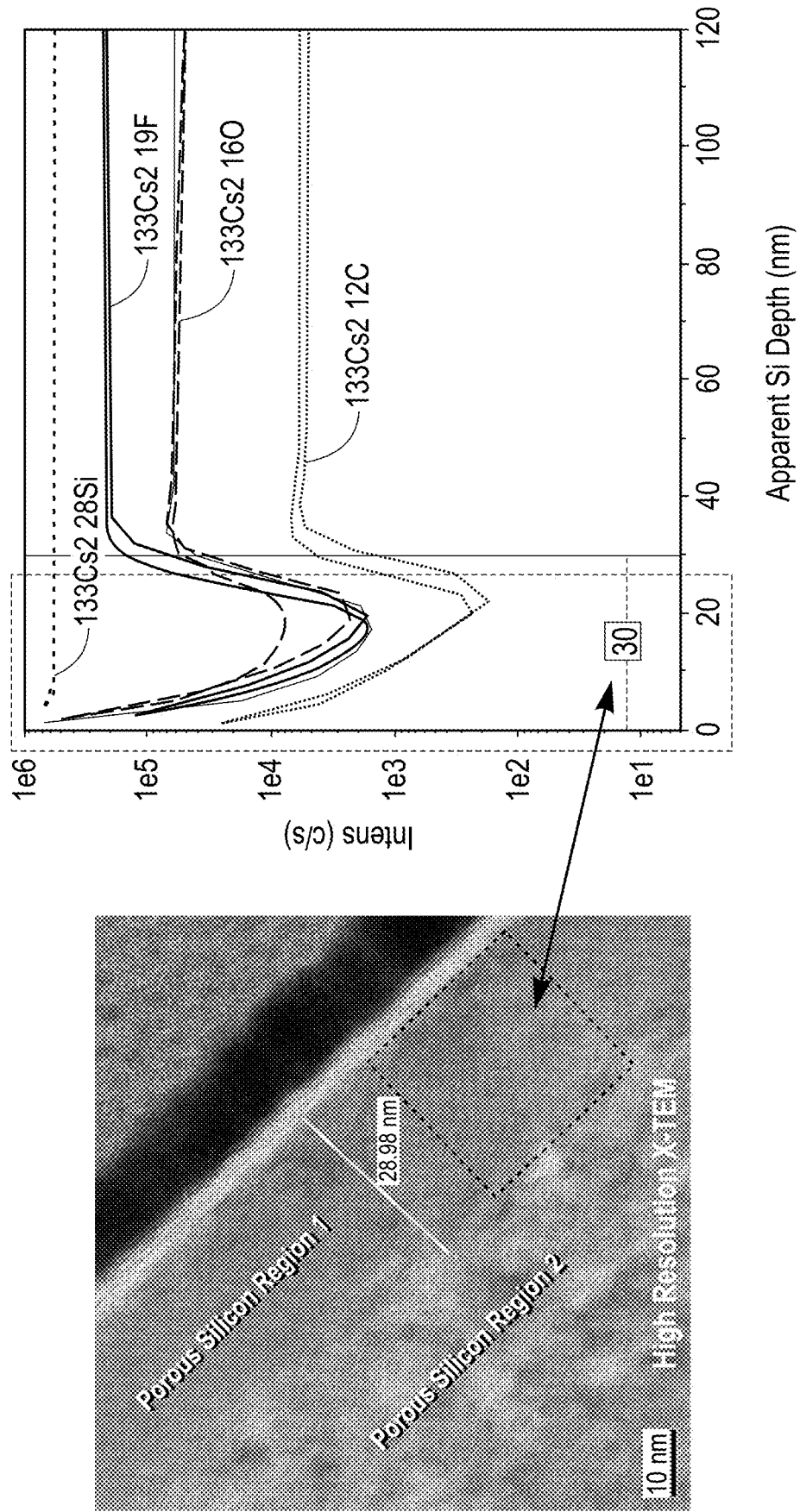
FIG. 8A is a high resolution transmission electron micrograph (HRTEM) of the porous silicon anode structure illustrating the thickness of Porous Region 1.
FIG. 8B is a secondary ion mass spectrometry (SIMS) spectrum of an initial~30 nm of a porous silicon anode structure corresponding to Porous Region 1 and an initial~90 nm of the same silicon anode structure corresponding to Porous Region 2.

FIG. 8A is a high resolution transmission electron micrograph of one embodiment of the porous silicon material referred to herein in FIG. 7A. The scale line in this figure illustrates the total thickness of Porous Region 1 being about 29 nm. FIG. 8B is a secondary ion mass spectroscopy (SIMS) profile of the porous silicon material shown in FIG. 8A. This SIMS profile illustrates the relatively low concentrations of carbon, oxygen and fluorine elements in the first 30 nm of the porous silicon materia—which correlates directly with Porous Region 1 (as indicated by the dashed boxes in FIG. 8A and FIG. 8B connected via a double sided arrow).

Figure 9A:
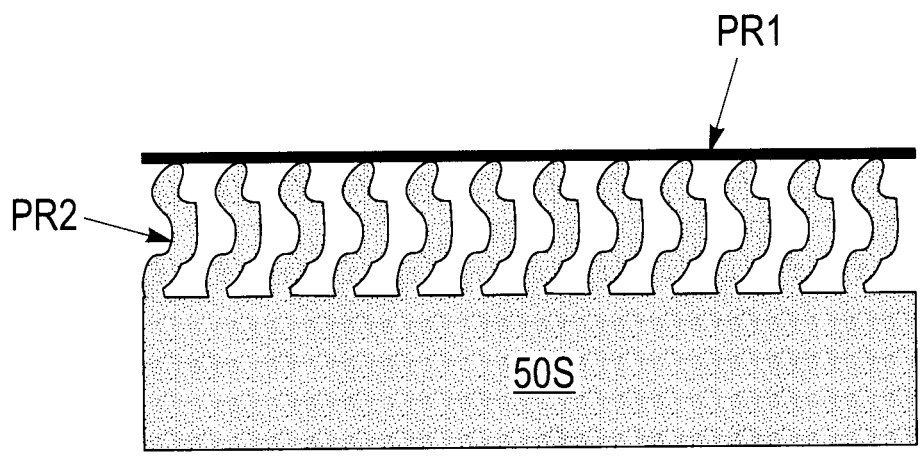
FIGS. 9A-9F represent a flow diagram showing the anode structure prior operational use (FIG. 9A) and during operational use, with a seed layer forming during a charge cycle (FIG. 9B), lithium plating occurring after continuous charging (FIG. 9C), and lithium stripping occurring during discharge (FIG. 9F), with SEM images of a porous silicon anode structure after 5 cycles when utilizing a liquid electrolyte (FIG. 9D) and another SEM image of a porous silicon anode structure after~250 cycles when utilizing a liquid electrolyte (FIG. 9E).
Figure 9B:
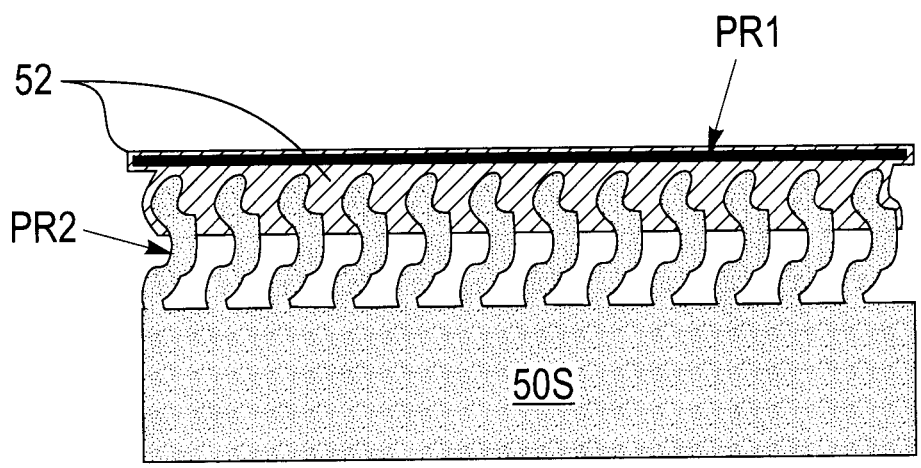
Figure 9C:
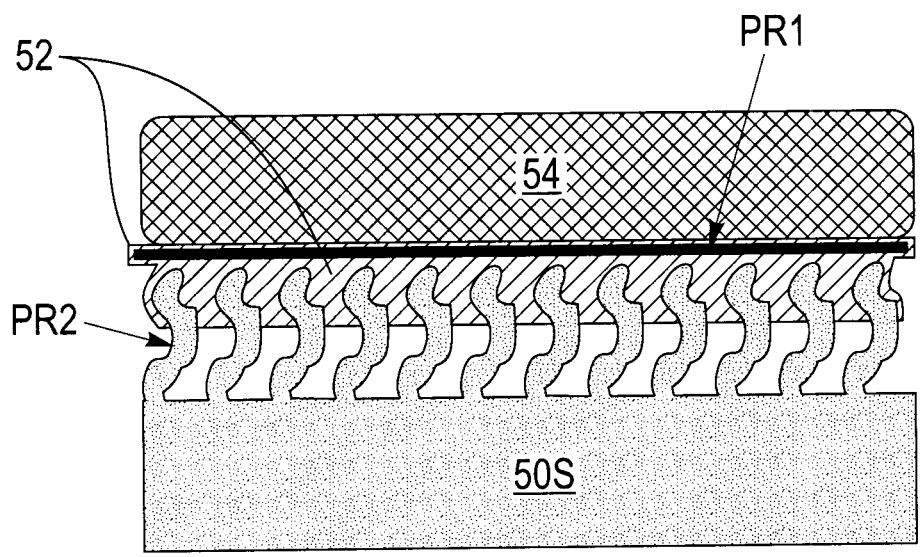
Figure 9D:
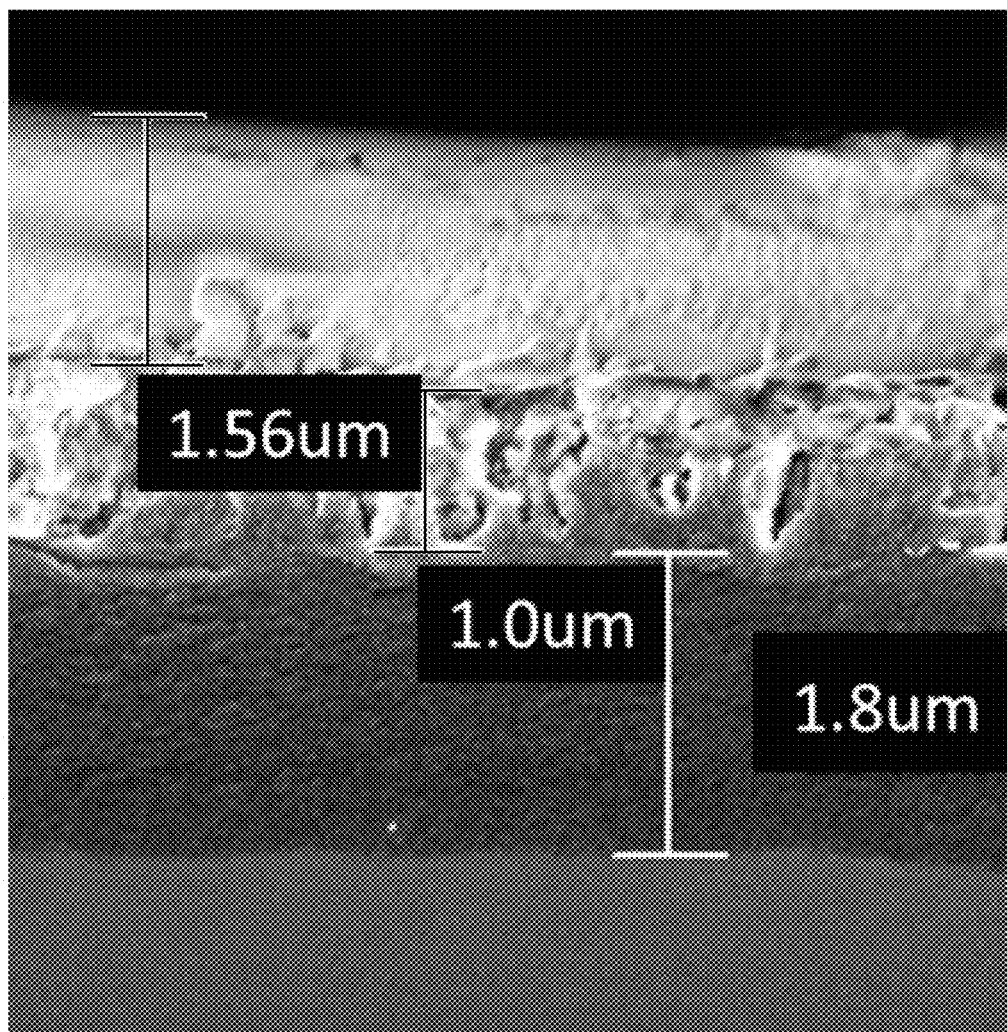
Figures 9E, 9F:
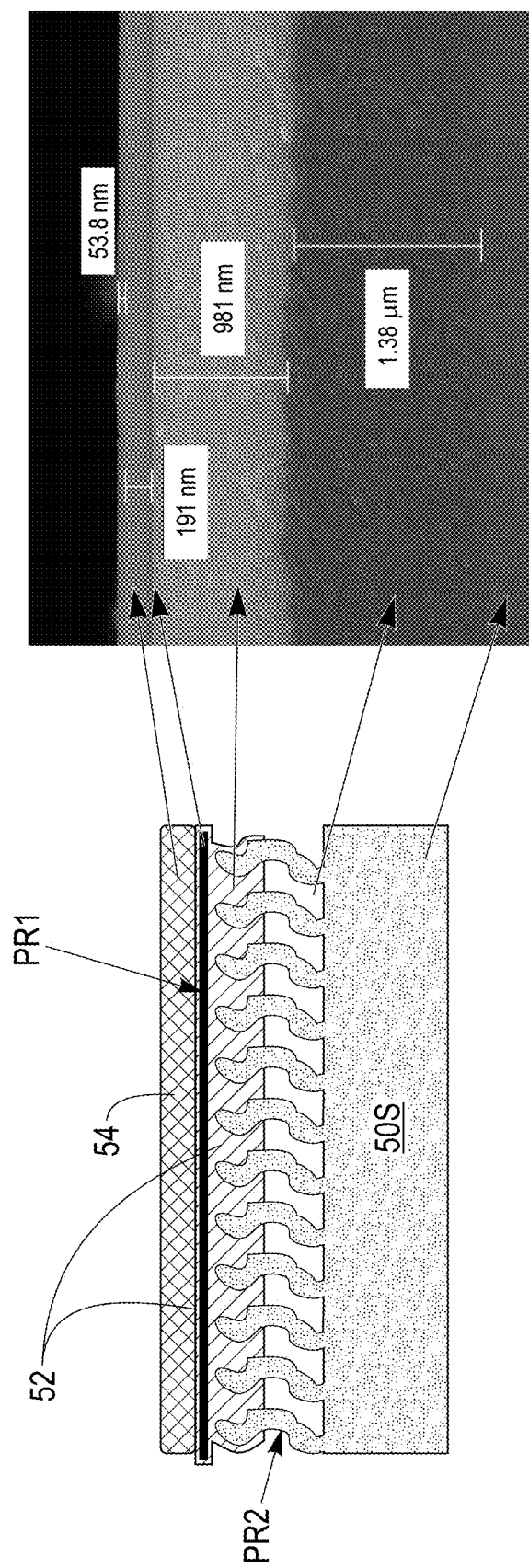

Referring now to FIGS. 9A-9F, there are shown a sequence of steps as a flow diagram, showing a porous silicon electrode (i.e., an anode structure including non-porous region 50S, Porous Region 2 (PR2) and Porous Region 1 (PR1)) and the operation of charge storage via the electrode material when a liquid-based electrolyte is used, with a seed layer 52 during charge and discharge cycles, accompanied with SEM images of a porous silicon electrode at 5 cycles (FIG. 9D) and at about 250 cycles (FIG. 9F). Notably, FIG. 9A illustrates a porous silicon electrode, as described and illustrated in FIG. 7A, prior to its incorporation into an electrochemical energy storage cell. The porous silicon electrode includes non-porous region 50S, Porous Region 2 (PR2) and Porous Region 1 (PR1). FIG. 9B is an illustration of the initial lithiation process of the porous silicon electrode when incorporated into a Li-ion electrochemical energy storage cell. During the initial exposure of the porous silicon electrode to the lithium ion containing electrolyte and/or during the initial time period of electrochemically lithiating the porous silicon electrode and/or during the initial charging of the porous silicon electrode, planar lithium-containing seed layer 52 formation occurs. As is shown, the lithium-containing seed layer 52 is located atop Porous Region 1 and a portion of the seed layer 52 may, in some embodiments, extend into an upper portion of Porous Region 2. The topmost surface of the seed layer 52 is typically flat, i.e., planar. FIG. 9C is a schematic illustration of the planar lithium plating occurring during the charging process. In FIG. 9C, element 54 denotes the planar lithium layer that forms during this operational step. It is noted that when the battery reaches full charge the thickness of the plated lithium metal 54 on the seed layer 52 is proportional to the amount of lithium deintercalated from the lithium-containing cathode material layer and as transferred from the electrolyte, as determined by a working voltage range.

FIG. 9D is a scanning electron micrograph cross section of a porous silicon electrode demonstrating the plating phenomena illustrated in FIG. 9C; where the cross-section image of the electrode is taken in the charged state after about 250 charge/discharge cycles. Lithium penetration is observed through Porous Region 1 but only in the top portion of Porous Region 2 in the charge state causing some cracks in upper parts of Porous Region 2. FIG. 9E is an illustration of the lithium de-plating occurring during the discharge process, where a portion of irreversibly plated lithium metal 54 on top of the seed layer 52 remains. Due to the discharge, the thickness of the remaining portion of the plated lithium metal 54 is substantially less than the thickness of planar lithium layer 54 formed during the charge state, as shown in FIG. 9C. It is noted that as the battery approaches a sustainable discharge state the thickness of the layer of lithium metal decreases proportionally, as determined by the working voltage range. FIG. 9F is a scanning electron micrograph cross-section of a porous silicon electrode in the discharge state which has been charged and discharged five times—corresponding to FIG. 9E. In one embodiment, the working voltage range is between 4.2V to 3.0V. In one embodiment, the lithium-containing cathode material layer is a lithium cobalt oxide. The above seed layer formation and lithium metal plating that occurs during charging, and the subsequent deplating of lithium metal that occurs during discharging is observed for lithium-ion batteries that contain a solid-state electrolyte or liquid electrolyte or any other type of electrolyte mentioned herein.

In some embodiments, the rechargeable lithium-ion battery of the present application can be charged and discharged over 200 cycles, when utilizing a sustainable working voltage, such as them one mentioned above. After 200 charge and discharge cycles, the surface of the plated lithium metal is nominally continuously planar, on average.

Figure 10A:
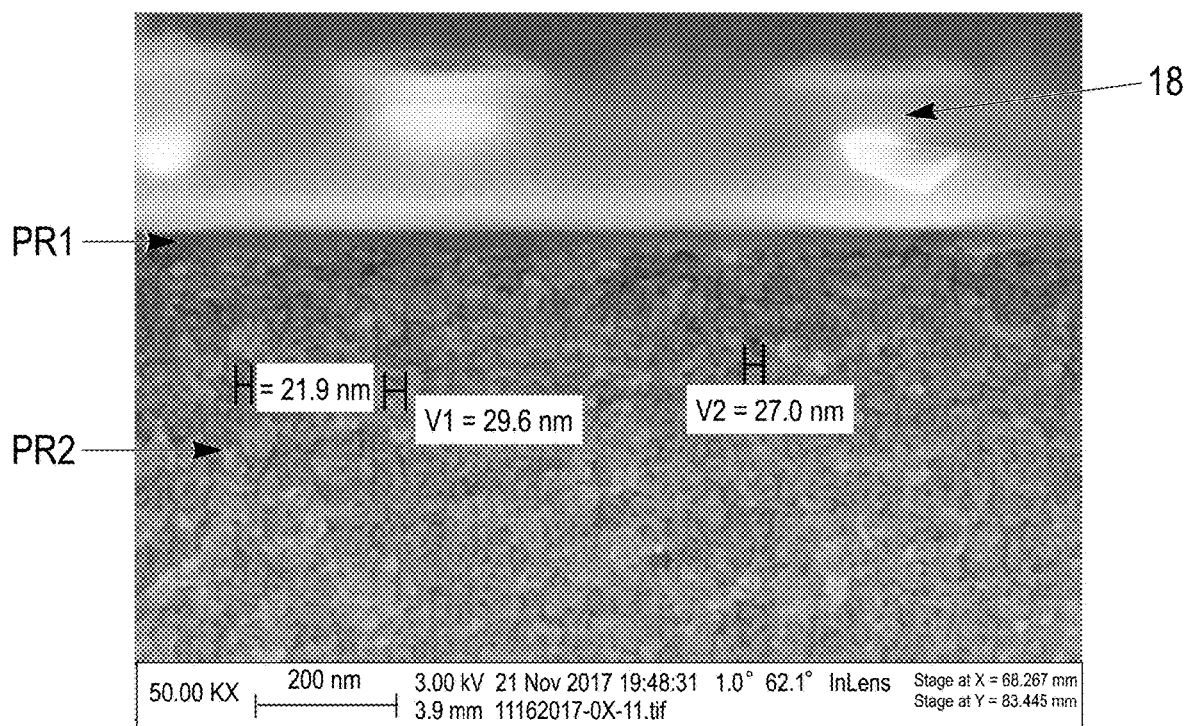
Figure 10B:
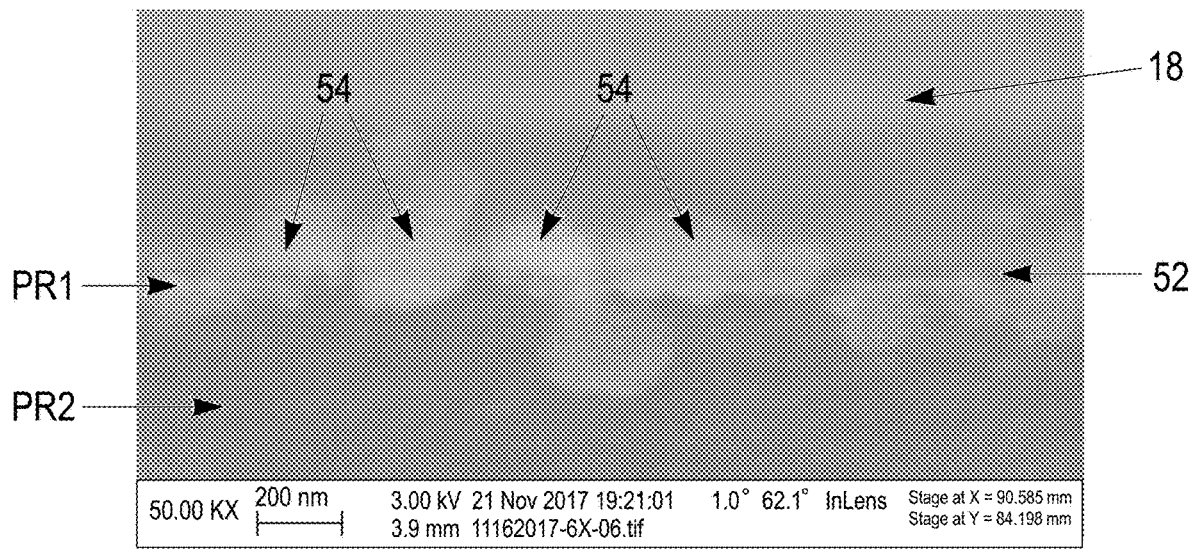
Figure 10C:
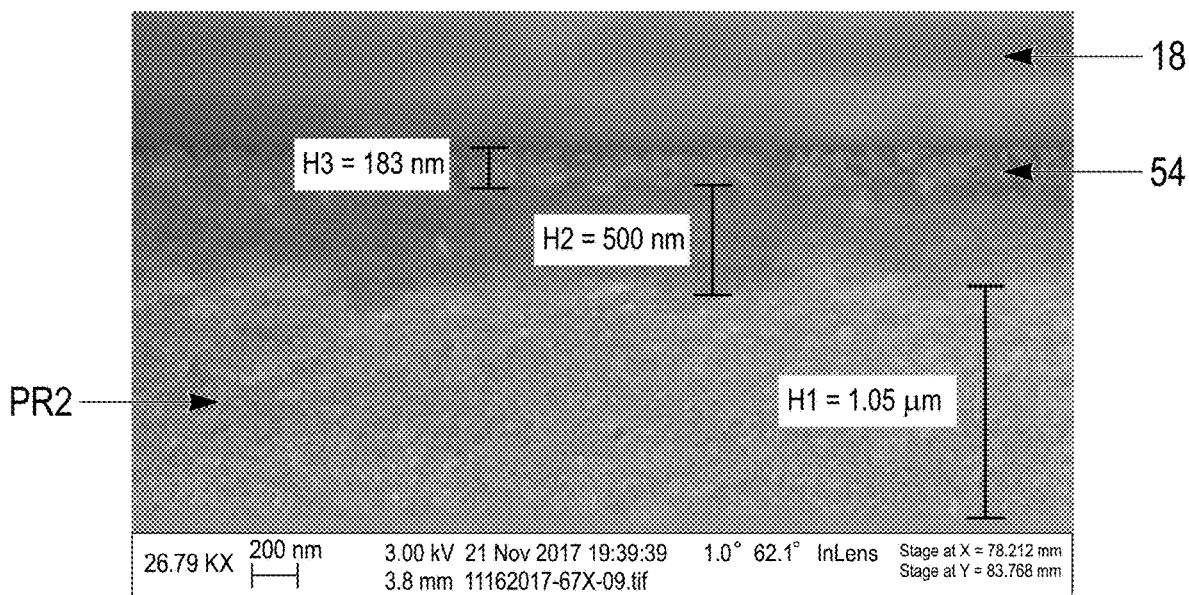

Referring now to FIGS. 10A-10D, there are shown actual SEM images for an all solid-state lithium ion battery in accordance with the present application and containing a structure similar to that shown in FIG. 1 in which the electrolyte region 18 is a solid-state material such as, for example LiPON. The structure also includes anode structure 12 shown as shown in FIG. 1 or FIG. 9A. Notably, FIG. 10A is a SEM of the structure prior to galvanostatic-or-potentiostatic-induced charge or discharge, FIG. 10B is another SEM of the structure after 6 charge and discharge cycles, and FIG. 10C is yet another SEM image of the structure after 56 charge and discharge cycles.

The SEM of FIG. 10A is a cross-section SEM image of the all-solid state battery, prior to galvanostatically or potentiostatically inducing electrochemical charge or discharge, showing a porous silicon electrode (i.e., an anode structure including non-porous region (not shown) Porous Region 2 (PR2) and a planar Porous Region 1 (PR1)), where a solid electrolyte region 18 resides above the Porous Region 1 (PR1). FIG. 10B is a cross-section SEM image of the all solid state cell illustrated in FIG. 10A, after 6 galvanostatically induced charge and discharge cycles, where, from bottom to top, Porous Region 2 (PR2), a Porous Region 1 (PR1) containing a lithium-containing seed layer 52 are observed. Notably, off-white features emanating from the Porous Region 1 (PR1)/solid electrolyte region 18 interface are clearly observed, where the features are thought to represent the reaction of air with the lithium rich material that comprised the lithium-containing seed layer 52 and/or comprised the plated lithium metal residing on the lithium-containing seed layer 52 which formed during the 6 charge/discharge cycles. FIG. 10C is a cross-section SEM image of the all solid state cell illustrated in FIG. 10A, after 67 galvanostatically induced charge and discharge cycles, where from bottom to top, the substantially original Porous Region 2 (PR2), a partially lithiated Porous Region 2 (PR2), a planar formation of lithium metal containing dendrite features mixed with solid-state electrolyte material in the Porous Region 1 (PR1) and the electrolyte region 18 are observed. During the initial exposure of the porous silicon electrode to the lithium ion containing electrolyte and/or during the initial time period of electrochemically lithiating the porous silicon electrode and/or during the initial charging of the porous silicon electrode, a planar lithium-containing seed layer 52 formation occurs. As is shown, the lithium containing seed layer 52 is located in the Porous Region 1 area and a portion of the seed layer 52 may extend into an upper portion of Porous Region 2. The topmost surface of the seed layer 52 is typically flat, i.e., planar, as observed in FIGS. 10A and 10B where PR1 and the seed layer 52 is in a planar, intimate contact with the electrolyte region 18, prior to cycling. This planar, lithium metal containing seed layer is thought to act as a host or nucleation site for subsequent plating/stripping of lithium metal during subsequent charge/discharge cycles, respectively. After 6 charge/discharge cycles, the lithium rich material which forms the seed layer and/or lithium-metal-plated-seed-layer, is altered from its immobilized, planar state upon destruction and cleaving of the cell in order to obtain the SEM image of FIG. 10B—where this respective lithium metal containing layer now reacts with ambient air chemistry, forming the off-white features which are observed emerging/emanating from the PR1/solid electrolyte region 18 interfacial region. In FIG. 10D, after 56 charge/discharge cycles, a substantially original Porous Region 2 (PR2) area is observed, above which a partially lithiated Porous Region 2 is observed (PR2), above which an approximately 183 nm planar layer of lithium-rich dendrite-type formations are observed in the Porous Region 1 (PR1) area, above which the LiPON electrolyte area is observed. Notably, the observation of the planar formation of lithium-rich dendrite features in/on the Porous Region 1 (PR1) region, which remain stable upon destruction and cleaving of the cell after 67 charge/discharge cycles, where intimate, continuous contact between the solid electrolyte region 18 and the lithium metal rich dendrite features in/on the Porous Region 1 (PR1) area, illustrates the high efficacy of the present invention as a stable lithium metal hosting porous silicon anode in all-solid-state batteries, in addition to liquid electrolyte containing stable lithium metal hosting porous silicon anode comprising batteries, as illustrated in FIGS. 9A-9F.

In some embodiments, and upon multiple charge/discharge cycles, in addition to dendrite formation at the lithium metal/electrolyte interface, a unique dendrite formation occurs on/along the (111) crystal silicon planes at the bottom porous layer/top porous layer interface.

The rechargeable lithium-ion batteries illustrated in FIGS. 1-5, 6A and 6B may have any size and/or shape. One example range includes: 10 µm to less than 1 mm (small) and large is anything above 1 mm. In one example, the size of the rechargeable lithium-ion batteries may be 100 µm×100 µm×100 µm. In another example, the size of the rechargeable lithium ion batteries may be 50 mm×50 mm×5 mm. In some embodiments, in which a semiconductor base substrate is present, the rechargeable lithium-ion batteries illustrated FIGS. 1-5, 6A and 6B may be integrated with semiconductor devices including for example, transistors, capacitors, diodes, laser diodes, light emitting devices, photovoltaic devices, central processing units, silicon based device structures, etc. The battery which powers the semiconductor devices, could both be on the same side or opposite side of the semiconductor substrate.

Integration may be performed in two ways: 1) Conventionally by preliminary patterning, lithography, etching of the semiconductor substrate prior to anodization and creation of porous semiconductor region, or 2) Via selective doping such as ion implantation and subsequent thermal annealing, such as furnace or lamp or laser annealing, or selective epitaxial growth, etc. Devices can be placed on same original semiconductor substrate or can be integrated with the same original semiconductor substrate or on an adjoined semiconductor substrate within a given working proximity (same side or opposite side of battery are possibilities).

The method of fabricating the anode structure 12 of the present application is now discussed in greater detail. The method of the present application provides 1) the "growth" or production or etching of a porous semiconductor region connected to a non-porous semiconductor region (such as a single crystalline silicon material) which can then be integrated into/with other silicon based technologies, 2) the successful integration and use of liquid, solid and semi-solid electrolytes and their high functioning capability in rechargeable batteries (versatile with any electrolyte), and 3) the thickness of the solid state electrolyte can be controlled in nm regime due to the specular and smooth surface of the starting silicon substrate which enables high control of battery performance, charge rate, ion mobility, and is compatible with physical deposited electrolytes.

Notably, the anode structure 12 of the present application can be made using an anodization process in which a substrate including at least an upper region of a p-type silicon material is immersed into a solution of concentrated HF (49%) while an electrical current is applied with a platinum as the anode and the substrate as the cathode. The anodization process is performed utilizing a constant current source that operates at a current density from 0.05 mA/cm² to 150 mA/cm², wherein mA is milli-Amperes. In some examples, the current density is 1 mA/cm², 2 mA/cm², 5 mA/cm², 50 mA/cm², or 100 mA/cm². In a preferred embodiment, the current density is from 1 mA/cm² to 10 mA/cm². The current density may be applied for 1 second to 5 hrs. In some examples, the current density may be applied for 5 seconds, 30 seconds, 20 minutes, 1 hour, of 3 hours. In an embodiment, the current density may be applied for 10 seconds to 1200 seconds, specifically for the doping level in the range $10^{19}$ cm³ range. The anodization process is typically performed at nominal room temperature from (20° C.) to 30° C.) or at a temperature that is slightly elevated from room temperature. Following the anodization process, the structure shown in FIG. 7B is typically rinsed with deionized water and then dried.

In some embodiments, and after anodiziation, the anode structure 12 may be cut into a desired dimension prior to being used. In some embodiments, the anode structure 12 may be placed upon and, optionally, bonded to the anode current collector, 10 as defined above, and thereafter the various other components of the lithium-ion battery may be formed. In other embodiments, the anode structure 12 may be placed upon and, optionally bonded to, the electrolyte region 18 of a pre-fabricated battery material stack that also includes a cathode region that includes a lithium-containing cathode material layer 20 and a cathode current collector 22.

Figure 11:
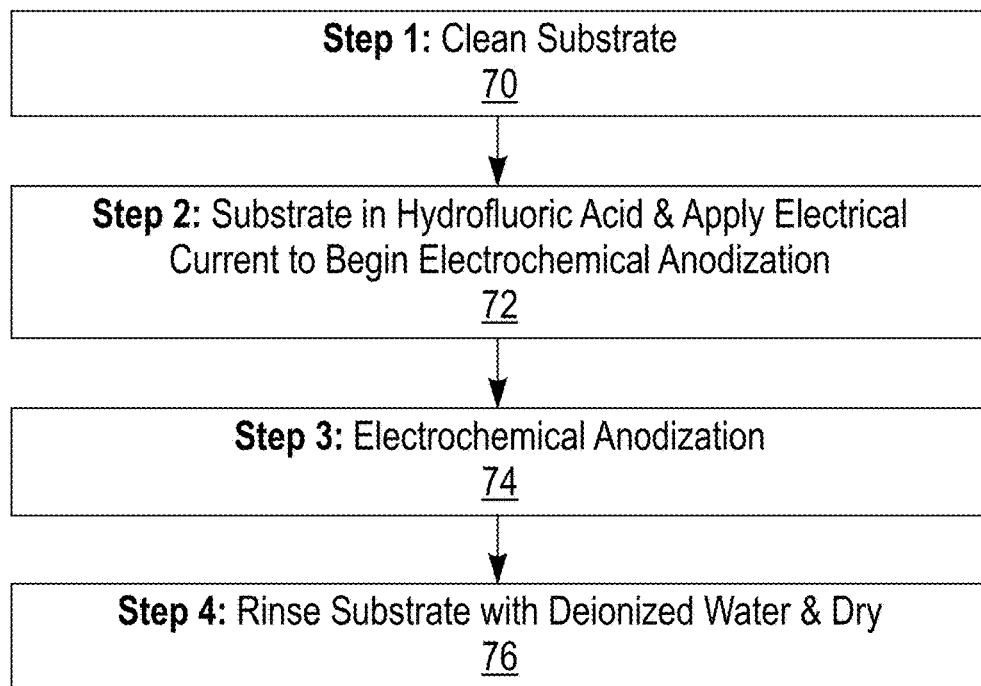
FIG. 11 is a flow chart illustrating one embodiment for making the anode structure of the present application.

Referring now to FIG. 11, there is illustrated a flow chart showing one embodiment for making the anode structure 12 of the present application. Notably, the anode structure 12 including the Porous Region 1 and Porous Region 2 and the non-porous region 14 (or 50S) discussed above can be formed utilizing the processing steps shown in FIG. 11. In one embodiment, the substrate 12 may be entirely composed of a p-type doped crystalline silicon material, while in other embodiments, other silicon materials or germanium (both doped or undoped) may be present beneath the p-type doped silicon material. The method may include in a first step, i.e., Step 1 (70), of cleaning the p-doped silicon substrate with a mixture of ammonium hydroxide, deionized water and hydrogen peroxide (5:1:1 v/v) at 60° C. to 80° C. for approximately 10 minutes. Next, and in Step 2 (72), the cleaned p-doped silicon substrate is immersed in 49% hydrofluoric acid and thereafter an electrical current is applied thereto to begin electrochemical anodization (i.e., anodizing etching). In one embodiment, the applied current is a constant current in a range of 1 mA/cm$^2$ to 10 mA/cm$^2$. In Step 3 (74), the anodizing etch continues using the following electrochemical anodization conditions: nominal room temperature (20° C. to 30° C.) and less than or equal to 5 mA/cm$^2$ for 10 s to 2000 s. After etching, and in Step 4 (76), the etched silicon substrate is rinsed with deionized water and the dried. The anodization process defined in Step 3 converts an upper portion of the substrate containing the p-doped silicon into Porous Region 1 and Porous Region 2 and the underlying substrate is not affected by the anodization process and forms the non-porous region 14 (or 50S) described above.

In any of the embodiments mentioned above and, as illustrated in FIGS. 1-5, 6A and 6B, the lithium-containing cathode material layer 20 may contain grains having a grain size of less than 100 nm, and a density of grain boundaries of $10^{10}$ cm$^{-2}$ or greater. In some embodiments, the grain size of the individual grains that constituent the lithium-containing cathode material layer 20 is from 1 nm to less than 100 nm. In some embodiments, the density of boundaries can be from $10^{10}$ cm$^{-2}$ to $10^{14}$ cm$^{-2}$. The term "grain boundary" is defined herein as an interface between two grains of materials. The grain boundaries are present in the lithium-containing cathode material layer 20 in a somewhat random orientation. Some of the grain boundaries may extend completely through the cathode material such that one end of the grain boundary is present at a bottommost surface of the cathode material and another end of the grain boundary is located at a topmost surface of the cathode material. In this embodiment, the grain boundaries are not oriented perpendicular to the topmost and bottommost surface of the lithium-containing cathode material layer 20.

In any of the embodiments mentioned above and, as illustrated in FIGS. 1-5, 6A and 6B, the lithium-containing cathode material layer 20 may have a columnar microstructure having columnar grain boundaries. The columnar grain boundaries are oriented perpendicular to the topmost surface and the bottommost surface of the lithium-containing cathode material layer 20. In such an embodiment, the lithium-containing cathode material layer 20 has a plurality of fin-like structures within the cathode material. The lithium-containing cathode material layer 20 having the columnar microstructure has a grain size of less than 100 nm, and a density of columnar grain boundaries of $10^{10}$ cm$^{-2}$ or greater. In some embodiments, the grain size of the individual grains that constituent the lithium-containing cathode material layer 20 is from 1 nm to less than 100 nm. In some embodiments, the density of columnar grain boundaries can be from $10^{10}$–$10^{14}$ cm$^{-2}$. In one embodiment, the electrically conductive cathode material is a lithium-containing material as defined above.

The presence of a lithium-containing cathode material layer 20 that contains grains having a grain size of less than 100 nm, and a density of grain boundaries of $10^{10}$ cm$^{-2}$ or greater, or a lithium-containing cathode material layer 20 having the columnar microstructure with the anode structure 12 of the present application in a rechargeable battery material stack as shown for example, in FIGS. 1-5, 6A and 6B of the present application facilitates fast and substantially or entirely vertical ion, i.e. Li-ion, transport which can lead to fast charging batteries.

Rechargeable batteries that contain anode structure 12 and a lithium-containing cathode material layer 20 which contains grains having a grain size of less than 100 nm, and a density of grain boundaries of $10^{10}$ cm$^{-2}$ or greater, or a lithium-containing cathode material layer 20 having the columnar microstructure may exhibit a charge rate of 5 C or greater, wherein C is the total battery capacity per hour. In some embodiments, the charge rate of the batteries that contain anode structure 12 and a lithium-containing cathode material layer 20 which contains grains having a grain size of less than 100 nm, and a density of grain boundaries of $10^{10}$ cm$^{-2}$ or greater, or a lithium-containing cathode material layer 20 having the columnar microstructure can be from 5 C to 1000 C or greater. Also, rechargeable batteries that contain the anode structure 12 and a lithium-containing cathode material layer 20 that contains grains having a grain size of less than 100 nm, and a density of grain boundaries of $10^{10}$ cm$^{-2}$ or greater, or a lithium-containing cathode material layer 20 having the columnar microstructure may have a capacity of 100 mAh/gm of cathode material or greater.

The lithium-containing cathode material layer 20 that contains grains having a grain size of less than 100 nm, and a density of grain boundaries of $10^{10}$ cm$^{-2}$ or greater, or the lithium-containing cathode material layer 20 having the columnar microstructure may be formed utilizing a sputtering process. In some embodiments, and following the sputtering of the cathode material, no subsequent anneal is performed; the cathode material that is sputtered without annealing provides a lithium-containing cathode material layer 20 that contains grains having a grain size of less than 100 nm, and a density of grain boundaries of $10^{10}$ cm$^{-2}$ or greater. In other embodiments, and following the sputtering of the cathode material, an anneal may be performed to provide a lithium-containing cathode material layer 20 having the columnar microstructure. Annealing is performed at a temperatures less than 300° C. to preserve the charge rate of greater 5 C. In one embodiment, sputtering may include the use of any precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof.

The lithium-containing cathode material layer 20 that contains grains having a grain size of less than 100 nm, and a density of grain boundaries of $10^{10}$ cm$^{-2}$ or greater, or the lithium-containing cathode material layer 20 having the columnar microstructure may have a thickness from 10 nm to 20 µm. Other thicknesses that are lesser than, or greater than, the aforementioned thickness values may also be used for the lithium-containing cathode material layer 20 that contains grains having a grain size of less than 100 nm, and a density of grain boundaries of $10^{10}$ cm$^{-2}$ or greater, or the lithium-containing cathode material layer 20 having the columnar microstructure. Thick lithium-containing cathode material layer 20 that contains grains having a grain size of less than 100 nm, and a density of grain boundaries of $10^{10}$ cm$^{-2}$ or greater, or the lithium-containing cathode material layer 20 having the columnar microstructure can provide enhanced battery capacity since there is more area, i.e., volume, to store the battery charge.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A battery comprising:
   a lithium-containing cathode material layer, wherein the lithium-containing cathode material layer is selected from a lithium-containing material containing grains having a grain size of less than 100 nm and a density of grain boundaries of 10$^{10}$ cm$^{-2}$ or greater, or a lithium-containing material having a columnar microstructure;
   an anode structure of unitary construction and including a non-porous region and a porous region comprising a top porous layer having a first thickness and a first porosity, and a bottom porous layer located beneath the top porous layer and forming an interface with the non-porous region, wherein at least an upper portion of the non-porous region and an entirety of the porous region are composed of silicon, and wherein the bottom porous layer has a second thickness that is greater than the first thickness, and a second porosity that is greater than the first porosity; and
   an electrolyte region located between the top porous layer of the anode structure and the lithium-containing cathode material layer.

2. The battery of claim 1, wherein the top porous layer, the bottom porous layer, and the non-porous region are entirely composed of silicon.

3. The battery of claim 2, wherein the silicon is single crystalline.

4. The battery of claim 1, wherein a lower portion of the non-porous layer is composed of doped silicon or a doped silicon germanium alloy having a germanium content of less than 10 atomic percent.

5. The battery of claim 1, wherein the first porosity of the upper porous layer has an average pore opening of less than 3 nm, and wherein the second porosity of the bottom porous layer has an average pore opening of greater than 3 nm.

6. The battery of claim 1, wherein the first thickness of the top porous layer is 50 nm or less.

7. The battery of claim 1, wherein the second thickness of the bottom porous layer is between 0.1 μm to 20 μm.

8. The battery of claim 1, wherein the non-porous region is composed of p-doped silicon that is single crystalline.

9. The battery of claim 1, wherein the non-porous region and the porous regions are entirely comprised of p-type doped silicon.

10. The battery of claim 1, wherein the silicon is p-doped silicon having a p-type dopant concentration in a range of 10$^{19}$ cm$^{-3}$.

11. The battery of claim 1, wherein the silicon is boron-doped silicon.

12. The battery of claim 1, further comprising an anode current collector contacting a surface of the non-porous region of the anode structure.

13. The battery of claim 1, further comprising a cathode current collector electrode contacting a surface of the lithium-containing cathode material layer.

14. The battery of claim 1, wherein the electrolyte region is composed of a solid-state electrolyte, a liquid electrolyte, a semi-solid electrolyte, an originally liquid then becoming solid electrolyte, a gel electrolyte, a polymer-containing electrolyte, a composite cathode/electrolyte combination, or any combination thereof.

15. The battery of claim 1, wherein the electrolyte region is entirely composed of a solid-state electrolyte.

16. The battery of claim 1, further comprising an interfacial additive material layer located between the top porous layer of the anode structure and the electrolyte region.

17. The battery of claim 1, further comprising an interfacial additive material layer located between the electrolyte and the lithium-containing cathode material layer.

18. The battery of claim 1, further comprising a first interfacial additive material layer located between the top porous layer of the anode structure and the electrolyte region, and a second interfacial additive material layer located between the electrolyte and the lithium-containing cathode material layer.

19. The battery of claim 1, wherein the porous region including the top and bottom porous layers are patterned.

20. The battery of claim 19, wherein the lithium-containing cathode material layer is patterned.

21. The battery of claim 1, wherein the porous region is located at the top, bottom or side of any three-dimensional structure.

22. The battery of claim 1, wherein the battery has a charge rate of 5 C or greater, wherein C is the total battery capacity per hour.

* * * * *